US012598631B2

(12) United States Patent
Xi et al.

(10) Patent No.: US 12,598,631 B2
(45) Date of Patent: Apr. 7, 2026

(54) BEAM MANAGEMENT IN A WIRELESS NETWORK

(71) Applicant: InterDigital Patent Holdings, Inc., Wilmington, DE (US)

(72) Inventors: Fengjun Xi, San Diego, CA (US); Wei Chen, San Diego, CA (US); Kyle Jung-Lin Pan, Saint James, NY (US); Moon-il Lee, Melville, NY (US); Chunxuan Ye, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 7 days.

(21) Appl. No.: 18/345,237

(22) Filed: Jun. 30, 2023

(65) Prior Publication Data

US 2023/0362968 A1     Nov. 9, 2023

Related U.S. Application Data

(63) Continuation of application No. 16/763,609, filed as application No. PCT/US2018/061267 on Nov. 15, 2018, now Pat. No. 11,723,049.

(Continued)

(51) Int. Cl.
H04W 16/28          (2009.01)
H04B 7/06           (2006.01)
(Continued)

(52) U.S. Cl.
CPC .......... H04W 72/53 (2023.01); H04B 7/0626 (2013.01); H04B 7/088 (2013.01);
(Continued)

(58) Field of Classification Search
CPC ............. H04W 72/0493; H04W 24/08; H04W 72/042; H04W 76/27; H04W 80/02;
(Continued)

(56) References Cited

U.S. PATENT DOCUMENTS 9,853,707 B2     12/2017  Yu et al.
10,506,587 B2     12/2019  Guo
(Continued)

FOREIGN PATENT DOCUMENTS

CN          104620551 A      5/2015
CN          105659687 A      6/2016
(Continued)

OTHER PUBLICATIONS

Qualcomm, Beam management offline discussion summary, 3GPP TSG-RAN WG1 #90bis, Prague, Czechia, Oct. 9-13, 2017, R1-1718920. (Year: 2017).*

(Continued)

*Primary Examiner* — Phuc H Tran
(74) *Attorney, Agent, or Firm* — Flaster Greenberg, P.C.

(57)          ABSTRACT
A wireless transmit/receive unit (WTRU) may receive a first downlink control information (DCI) in a first slot. The first DCI may include an indication of a first quasi co-location (QCL) reference. The WTRU may receive a second DCI in a second slot. The second DCI may include scheduling information for a first physical downlink shared channel (PDSCH) transmission. The WTRU may receive the first PDSCH transmission in accordance with the first QCL reference indicated by the first DCI received in the first slot and in accordance with the scheduling information for the first PDSCH transmission included in the second DCI received in the second slot.

17 Claims, 15 Drawing Sheets

Related U.S. Application Data

(60) Provisional application No. 62/716,215, filed on Aug. 8, 2018, provisional application No. 62/652,805, filed on Apr. 4, 2018, provisional application No. 62/630,649, filed on Feb. 14, 2018, provisional application No. 62/615,715, filed on Jan. 10, 2018, provisional application No. 62/586,612, filed on Nov. 15, 2017.

(51) Int. Cl.

| | |
|---|---|
| *H04B 7/08* | (2006.01) |
| *H04L 5/00* | (2006.01) |
| *H04W 24/08* | (2009.01) |
| *H04W 72/23* | (2023.01) |
| *H04W 72/53* | (2023.01) |
| *H04W 76/27* | (2018.01) |
| *H04W 80/02* | (2009.01) |

(52) U.S. Cl.
CPC .......... *H04L 5/0051* (2013.01); *H04L 5/0092* (2013.01); *H04W 24/08* (2013.01); *H04W 72/23* (2023.01); *H04W 76/27* (2018.02); *H04W 80/02* (2013.01)

(58) Field of Classification Search
CPC ... H04W 72/046; H04B 7/0626; H04B 7/088; H04B 7/02; H04L 5/0051; H04L 5/0092; H04L 5/0094; H04L 5/0044; H04L 5/0053

See application file for complete search history.

(56) References Cited

U.S. PATENT DOCUMENTS

| | | | |
|---|---|---|---|
| 2013/0286960 | A1 | 10/2013 | Li et al. |
| 2014/0023006 | A1 | 1/2014 | Jeong et al. |
| 2016/0192376 | A1 | 6/2016 | Lee et al. |
| 2017/0012692 | A1 | 1/2017 | Kim et al. |
| 2017/0134913 | A1 | 5/2017 | Cui et al. |
| 2017/0207843 | A1 | 7/2017 | Jung et al. |
| 2017/0302355 | A1 | 10/2017 | Islam et al. |
| 2018/0324843 | A1 | 11/2018 | Lee et al. |
| 2019/0141691 | A1* | 5/2019 | Kwon ...................... H04L 5/00 |
| 2020/0067676 | A1 | 2/2020 | Yi |
| 2020/0137588 | A1 | 4/2020 | Zhang et al. |
| 2020/0267571 | A1* | 8/2020 | Park ...................... H04L 5/0051 |

FOREIGN PATENT DOCUMENTS

| | | | |
|---|---|---|---|
| CN | 106031051 | A | 10/2016 |
| CN | 106576253 | A | 4/2017 |
| EP | 3454477 | A1 | 3/2019 |
| GB | 2560770 | A | 9/2018 |
| TW | 201722182 | A | 6/2017 |
| TW | 201739187 | A | 11/2017 |
| TW | I776805 | B | 9/2022 |
| WO | WO 2017/086922 | A1 | 5/2017 |
| WO | WO 2017/095470 | A1 | 6/2017 |
| WO | WO 2017/180336 | A1 | 10/2017 |

OTHER PUBLICATIONS

Samsung et al., WF on Beam Management, 3GPP TSG-RAN WG1 #90bis, Prague, Czechia, Oct. 9-13, 2017, R1-1719059 (Year: 2017).*

Samsung, Discussion on beam indication for PDSCH, 3GPP TSG RAN WG1 Meeting #90bis, Prague, Czech, Oct. 9-13, 2017, R1-1717612. (Year: 2017).*

Huawei, HiSilicon, Beam indication for control and data channels, 3GPP TSG RAN WG1 Meeting 90bis, Prague, Czech Republic, Oct. 9-13, 2017, R1-1718238 (Year: 2017).*

3rd Generation Partnership Project, Qualcomm, Beam management offline discussion summary, R1-1718920, 3GPP TSG-RAN WG1 #90bis, Prague, Czechia, Oct. 9-13, 2017.

3rd Generation Partnership Project, WF on Beam Management, R1-1719059, Samsung et al 3GPP TSG-RAN WG1 #90bis, Prague, Czechia, Oct. 9-13, 2017, 8 pages.

3rd Generation Partnership Project, Technical Specification Group Radio Access Network; NR; Physical layer procedures for data (Release 15), 3GPP TS 38.214 V15.0.0, Dec. 2017.

3rd Generation Partnership Project, Downlink beam indication, R1-1712377, CATT, 3GPP TSG RAN WG1 Meeting #90, Aug. 25, 2017, 7 pages.

3rd Generation Partnership Project, WF on Beam Management, Samsung, et al., R1-1718984, 3GPP TSG RAN WG1 Meeting #90, Oct. 13, 2017, 8 pages.

3rd Generation Partnership Project, Summary of QCL, R1-1716692, 19 3GPP, monitor and PDCCH and TCI and PDSCH and QCL and corset, Sep. 18-21, 2017, 15 pages.

3rd Generation Partnership Project, On beam indication, measurement, and reporting, R1-1718433, 19 3GPP, monitor and PDCCH and TCI and PDSCH and QCL and corset and pd <20171115, Oct. 9-13, 2017, 9 pages.

3rd Generation Partnership Project, Beam indication for control and data channels, R1-1718238, 3GPP TSG RAN WG1 Meeting 90bis, Oct. 9-13, 2017, 8 pages.

3rd Generation Partnership Project, Work plan for Rel-15 NR WI, R1-1718177, 3GPP, monitor and BPL and TCI and PDCCH and PDSCH and QCL and coreset, Oct. 9-13, 2017, 173 pages.

3rd Generation Partnership Project, Remaining details on QCL, R1-1717634, 91 3GPP, monitor and BPL and TCI and PDCCH and PDSCH and QCL and coreset, Oct. 9-13, 2017, 9 pages.

3rd Generation Partnership Project, Multi-beam Transmission for NR-PDCCH, R1-1707987, 94 3GPP, beam management and pd <20171115 and pdsch and pdcch and monitor and coreset, May 15-19, 2017, 7 pages.

3rd Generation Partnership Project, Beam Management for PDCCH, R1-1711604, 3GPP TSG RAN WG1 Meeting NR AH2, Jun. 27-30, 2017, 6 pages.

3rd Generation Partnership Project, On Beam Indication, R1-1713595, 52 3GPP, beam management and pd <20171115 and pdsch and pdcch and monitor and corset and dci and offset and (DL or downlink), Aug. 21-25, 2017, 9 pages.

3rd Generation Partnership Project, Technical Specification Group Radio Access Network; NR, 3GPP TS 38.214 V1.0.0, Third Generation Partnership Project, "Technical Specification Group Radio Access Network; NR; Physical layer procedures for data (Release 15),", Sep. 2017, 32 pages.

3rd Generation Partnership Project, Technical Specification Group Radio Access Network; NR, 3GPP TS 38.214 V15.3.0, Third Generation Partnership Project, Physical layer procedures for data (Release 15), Sep. 2018, 96 pages.

3rd Generation Partnership Project, Discussion on beam indication for PDSCH, 3GPP TSG RAN WG1 Meeting #90bis, R1-1717612, Prague, Czech, Oct. 9-13, 2017.

3rd Generation Partnership Project, Technical Specification group Radio Access Network; Study on Scenarios and Requirements for Next generation Access Technologies; (Release 14), 3GPP TR 38.913 V0.3.0, Mar. 2016.

3rd Generation Partnership Project, Technical Specification group Radio Access Network; Study on Scenarios and Requirements for Next generation Access Technologies; (Release 14), 3GPP TR 38.913 V14.3.0, Jun. 2017.

3rd Generation Partnership Project, Technical Specification group Radio Access Network; Study on Scenarios and Requirements for Next generation Access Technologies; (Release 15), 3GPP TR 38.913 V15.0.0, Jun. 2018.

3rd Generation Partnership Project, "Remaining issues on beam management," 3GPP TSG RAN WG1 Meeting #93, R1-1807014, Busan, Korea (May 21-25, 2018).

3rd Generation Partnership Project, "Remaining issues on beam management," 3GPP TSG RAN WG1 Meeting #92bis, R1-1804845, Sanya, China (Apr. 16-20, 2018).

(56)                References Cited

OTHER PUBLICATIONS

3rd Generation Partnership Project, "Remaining issues on beam management," 3GPP TSG RAN WG1 Meeting #92, R1-1802620, Athens, Greece (Feb. 26-Mar. 2, 2018).
3rd Generation Partnership Project., "Remaining issues on beam management," 3GPP TSG RAN WG1 Meeting AH 1801, R1-1800734, Vancouver, Canada (Jan. 22-26, 2018).
3rd Generation Partnership Project, "Remaining issues on beam management," 3GPP TSG RAN WG1 Meeting #91, R1-1720630, Reno, USA (Nov. 27-Dec. 1, 2017).
3rd Generation Partnership Project, "Remaining issues on beam management," 3GPP TSG RAN WG1 Meeting #90bis, R1-1718482, Prague, Czech Republic (Oct. 9-13, 2017).
3rd Generation Partnership Project, Rani Chairman's Notes, 3GPP TSG RAN WG1 Meeting 90bis, Prague, CZ (Oct. 9-13, 2017).
3rd Generation Partnership Project, Rani Chairman's Notes, 3GPP TSG RAN WG1 Meeting AH 1801, Vancouver, Canada (Jan. 22-26, 2018).
3rd Generation Partnership Project, Rani Chairman's Notes, 3GPP TSG RAN WG1 Meeting NR Ad-Hoc, Spokane, USA (Jan. 16-20, 2017).
3rd Generation Partnership Project, Rani Chairman's Notes, 3GPP TSG RAN WG1 Meeting NR#3, Nagoya, Japan (Sep. 18-21, 2017).
3rd Generation Partnership Project, "Technical Specification Group Radio Access Network; NR; Physical layer procedures for control (Release 15)," 3GPP TS 38.213 V1.0.0 (Sep. 2017).
3rd Generation Partnership Project, "Technical Specification Group Radio Access Network; NR; Physical layer procedures for control (Release 15)," 3GPP TS 38.213 V15.3.0 (Sep. 2018).
Alkhateeb et al., "MI MO Precoding and Combining Solutions for Millimeter-Wave Systems," IEEE Communications Magazine, vol. 52, No. 12, pp. 122-131 (Dec. 2014).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropoli-
tan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
3rd Generation Partnership Project, "Beam management", Nokia, Nokia Shanghai Bell, R2-1711451, NR_newRAT-Core—Release 15, Prague, Czech Republic, Oct. 9-13, 2017, 4 pages.
3rd Generation Partnership Project, "Beam management", Nokia, Alcatel-Lucent Shanghai Bell, R2-1707197, NR_newRAT-Core—Release 15, Qingdao, China, Jun. 27-29, 2017, 4 pages.
Third Generation Partnership Project (3GPP), "On Beam Indication", Samsung, 3GPP TSG RAN WG1 Meeting 90bis, R1-1717627, Oct. 9-13, 2017, 9 pages.
Third Generation Partnership Project (3GPP), "Consideration on Beam Management", CATT, R1-1717812, Oct. 9-13, 2017, 10 pages.
3GPP TS 38.214 V1.1.1, "Physical layer procedures for data (Release 15)", 3rd Generation Partnership Project; Technical Specification Group Radio Access Network; NR, Oct. 2017, 51 pages.
3GPP_TSG_RAN_WG1, "[90b-NR-17] Emails discussion to finalize the parameter list for BM", 3 Nov. 7, 2017.
3GPP_TSG_RAN_WG1, "[90b-NR-18] Email discussion on remaining beam failure recovery issues", Nov. 3, 2017.
U.S. Appl. No. 62/571,326, filed October 12, 2027, Priority Document of US10506587B2.
U.S. Appl. No. 62/583,883, filed Nov. 9, 2017, Priority Document of EP3454477A1.

* cited by examiner

BEAM MANAGEMENT IN A WIRELESS NETWORK

CROSS REFERENCE TO RELATED APPLICATIONS

This application is a continuation of U.S. patent application Ser. No. 16/763,609, filed on May 13, 2020, which is the National Stage entry under 35 U.S.C. § 371 of Patent Cooperation Treaty Application No. PCT/US2018/061267, filed Nov. 15, 2018, which claims the benefit of U.S. Provisional Application Ser. No. 62/716,215, filed Aug. 8, 2018; U.S. Provisional Application Ser. No. 62/652,805, filed Apr. 4, 2018; U.S. Provisional Application Ser. No. 62/630,649, filed Feb. 14, 2018; U.S. Provisional Application Ser. No. 62/615,715, filed Jan. 10, 2018; and U.S. Provisional Application Ser. No. 62/586,612, filed Nov. 15, 2017; the entire contents of which are hereby incorporated by reference herein.

BACKGROUND

Next generation mobile communications and applications may utilize enhanced mobile broadband (eMBB), massive Machine Type Communication (mMTC), Ultra-Reliable Low Latency Communications (URLLC), or the like. Spectrum bands ranging from 700 MHz to 80 GHz may be configured and utilized for next generation mobile communications and applications to deliver higher speeds and reliability to devices. Spectrum may be licensed, unlicensed, mixed-use, or the like. Beam selection, forming, steering, or the like may be configured for downlink or uplink communications for next generation mobile communications and applications.

SUMMARY

A wireless transmit/receive unit (WTRU) may be configured to utilize a status in a beam selection process. Beam selection may be based on the WTRU moving or being stationary and configured with downlink control information (DCI). A WTRU may also utilize pre-configured settings for beam selection or utilize a beam previously indicated by a DCI.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
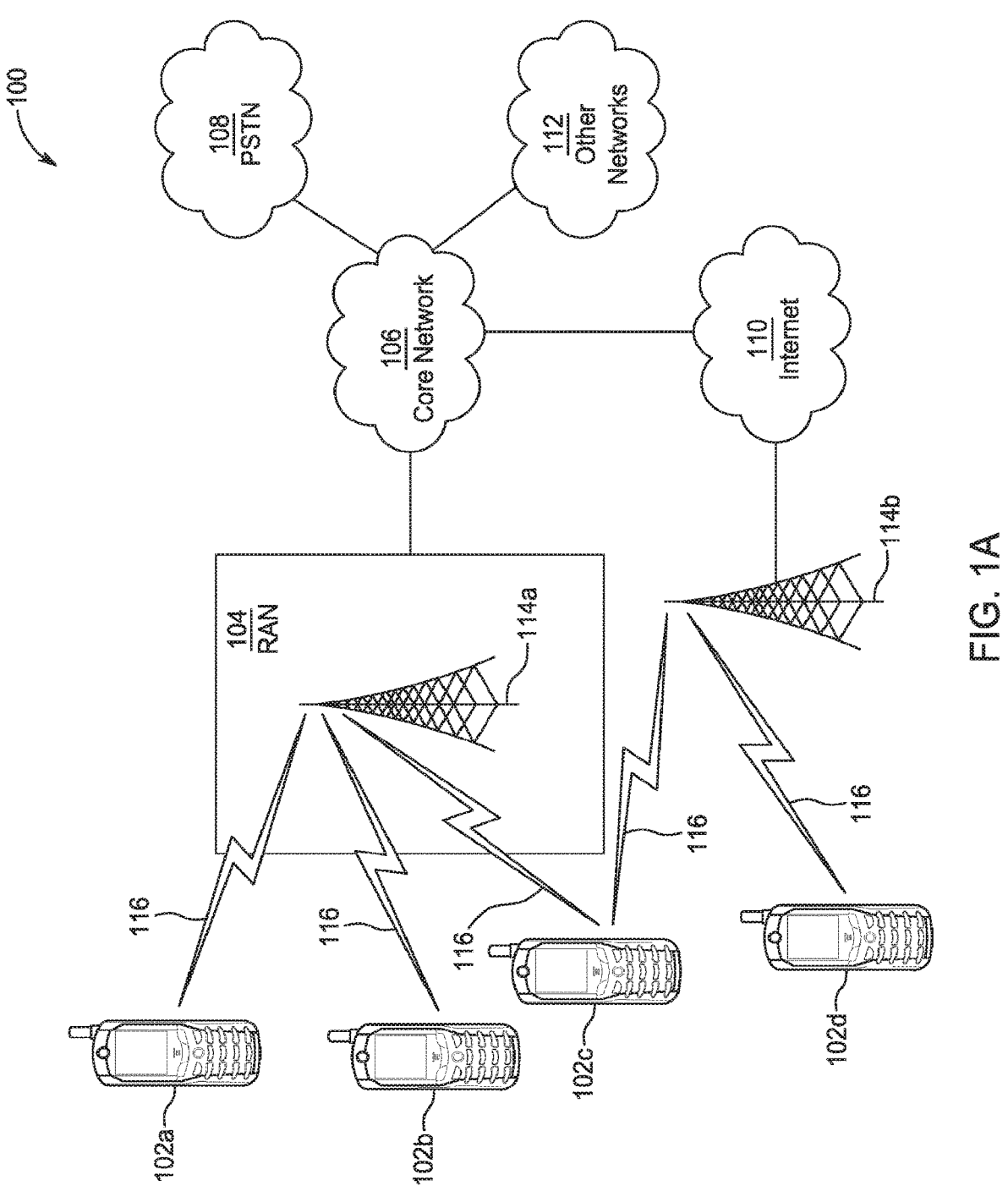
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT UW DFT-s OFDM), unique word OFDM (UW-OFDM), resource block-filtered OFDM, filter bank multi-carrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Wi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications system 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a next generation node b (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be substantially fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple-output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or communications sent to/from multiple types of base stations (e.g., an eNB and a gNB).

In other embodiments, the base station 114*a* and the WTRUs 102*a*, 102*b*, 102*c* may implement radio technologies such as Institute of Electrical and Electronics Engineers (IEEE) 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communication networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
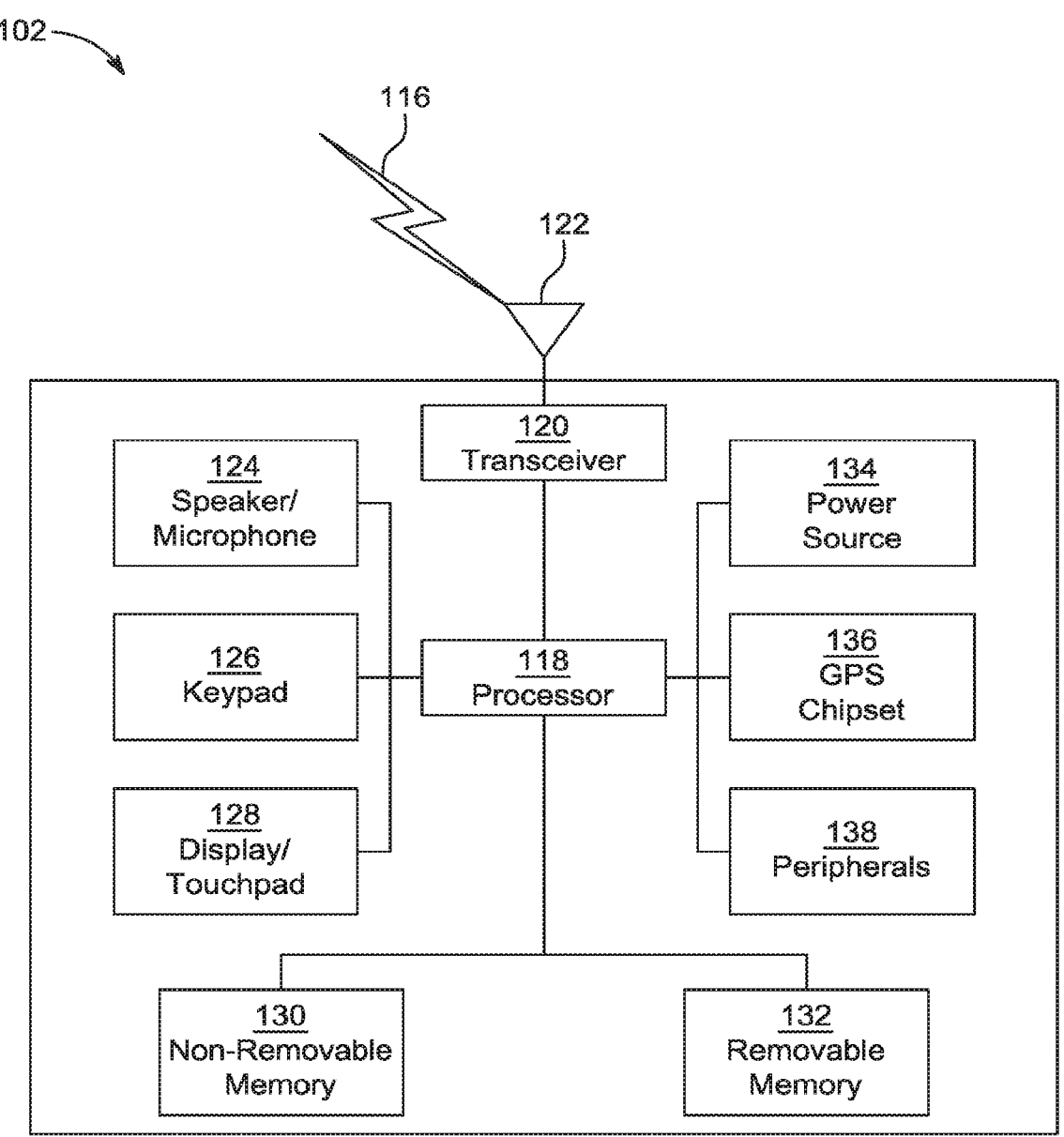
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, a humidity sensor, or the like.

The WTRU 102 may include a full duplex radio for which transmission and reception of some or all of the signals (e.g., associated with particular subframes for both the UL (e.g., for transmission) and downlink (e.g., for reception) may be concurrent, simultaneous, or the like. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
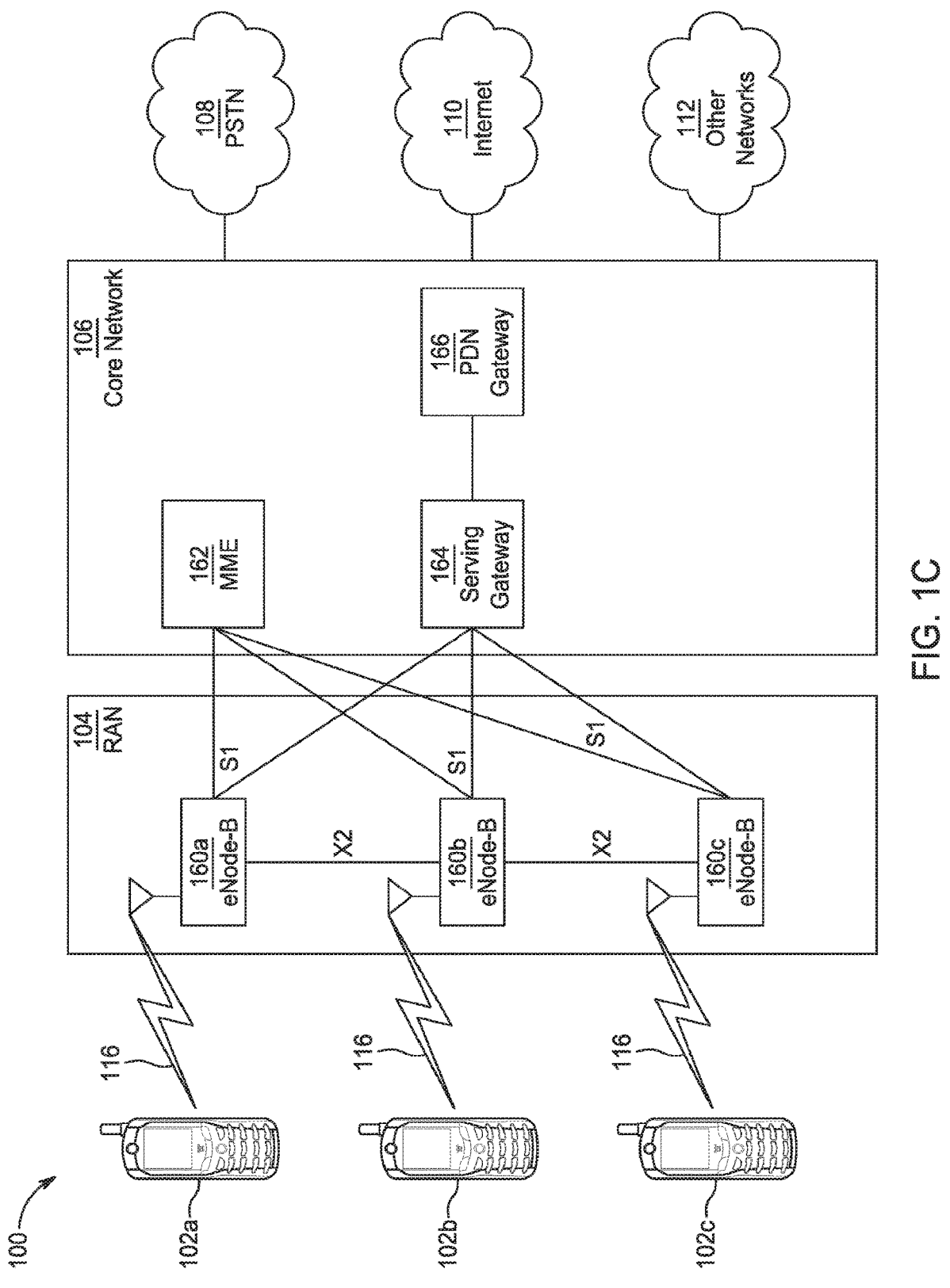
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may also be referred to as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width set via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/
CA, the STAs (e.g., every STA), including the AP, may sense
the primary channel. If the primary channel is sensed/
detected and/or determined to be busy by a particular STA,
the particular STA may back off. One STA (e.g., only one
station) may transmit at any given time in a given BSS.

High Throughput (HT) STAs may use a 40 MHz wide
channel for communication, for example, via a combination
of the primary 20 MHz channel with an adjacent or nonad-
jacent 20 MHz channel to form a 40 MHz wide channel.

Very High Throughput (VHT) STAs may support 20
MHz, 40 MHz, 80 MHz, and/or 160 MHz wide channels.
The 40 MHz, and/or 80 MHz, channels may be formed by
combining contiguous 20 MHz channels. A 160 MHz chan-
nel may be formed by combining 8 contiguous 20 MHz
channels, or by combining two non-contiguous 80 MHz
channels, which may be referred to as an 80+80 configura-
tion. For the 80+80 configuration, the data, after channel
encoding, may be passed through a segment parser that may
divide the data into two streams. Inverse Fast Fourier
Transform (IFFT) processing, or time domain processing,
may be done on each stream separately. The streams may be
mapped on to the two 80 MHz channels, and the data may
be transmitted by a transmitting STA. At the receiver of the
receiving STA, the above described operation for the 80+80
configuration may be reversed, and the combined data may
be sent to the Medium Access Control (MAC).

Sub 1 gigahertz (GHz) modes of operation are supported
by 802.11af and 802.11ah. The channel operating band-
widths, and carriers, are reduced in 802.11af and 802.11ah
relative to those used in 802.11n, and 802.11ac. 802.11af
supports 5 MHz, 10 MHz and 20 MHz bandwidths in the TV
White Space (TVWS) spectrum, and 802.11ah supports 1
MHz, 2 MHz, 4 MHz, 8 MHz, and 16 MHz bandwidths
using non-TVWS spectrum. According to a representative
embodiment, 802.11ah may support Meter Type Control/
Machine-Type Communication (MTC), such as MTC
devices in a macro coverage area. MTC devices may have
certain capabilities, for example, limited capabilities includ-
ing support for (e.g., only support for) certain and/or limited
bandwidths. The MTC devices may include a battery or
mobile power store with a life above a threshold (e.g., to
maintain a very long battery life or power life).

WLAN systems, which may support multiple channels,
and channel bandwidths, such as 802.11n, 802.11ac,
802.11af, and 802.11ah, include a channel which may be
designated as the primary channel. The primary channel may
have a bandwidth equal to the largest common operating
bandwidth supported by all STAs in the BSS. The bandwidth
of the primary channel may be set and/or limited by a STA,
from among all STAs in operating in a BSS, which supports
the smallest bandwidth operating mode. In the example of
802.11ah, the primary channel may be 1 MHz wide for STAs
(e.g., MTC type devices) that support (e.g., only support) a
1 MHz mode, even if the AP, and other STAs in the BSS
support 2 MHz, 4 MHz, 8 MHz, 16 MHz, and/or other
channel bandwidth operating modes. Carrier sensing and/or
Network Allocation Vector (NAV) settings may depend on
the status of the primary channel. If the primary channel is
busy, due to a STA, such as a 1 MHz operating mode STA,
transmitting to the AP, whole frequency bands may be
considered busy even though a majority of frequency bands
remain idle and may be available.

In the United States, the available frequency bands, which
may be used by 802.11ah, are from 902 MHz to 928 MHz.
In Korea, the available frequency bands are from 917.5 MHz
to 923.5 MHz. In Japan, the available frequency bands are from 916.5 MHz to 927.5 MHz. The total bandwidth avail-
able for 802.11ah is 6 MHz to 26 MHz depending on the
country code.

Figure 1D:
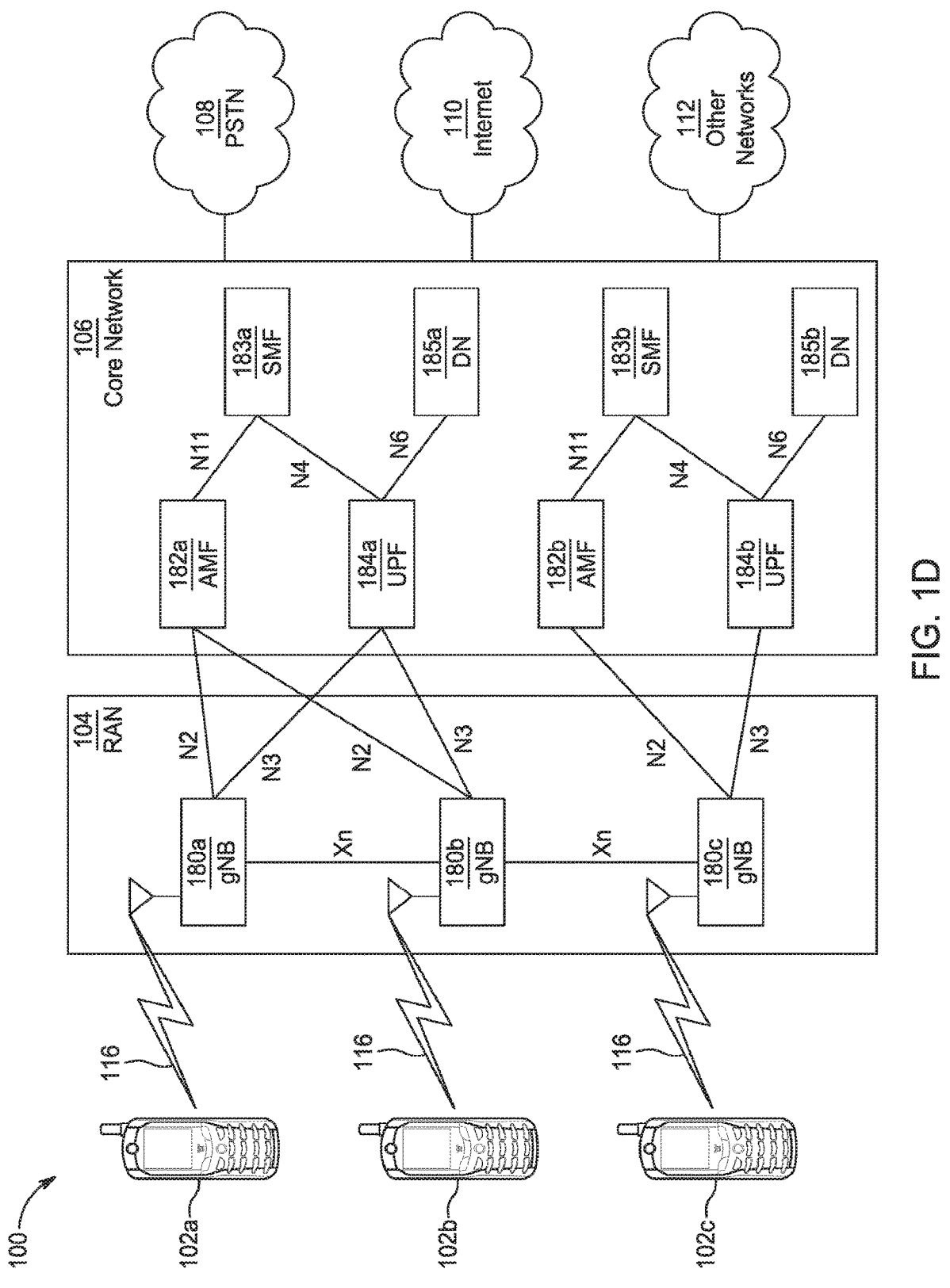
FIG. 1D is a system diagram illustrating a further example RAN and a further example CN that may be used within the communications system illustrated in FIG. 1A according to an embodiment.

FIG. 1D is a system diagram illustrating the RAN 104 and
the CN 106 according to an embodiment. As noted above,
the RAN 104 may employ an NR radio technology to
communicate with the WTRUs 102a, 102b, 102c over the air
interface 116. The RAN 104 may also be in communication
with the CN 106.

The RAN 104 may include gNBs 180a, 180b, 180c,
though it will be appreciated that the RAN 104 may include
any number of gNBs while remaining consistent with an
embodiment. The gNBs 180a, 180b, 180c may each include
one or more transceivers for communicating with the
WTRUs 102a, 102b, 102c over the air interface 116. In one
embodiment, the gNBs 180a, 180b, 180c may implement
MIMO technology. Also, in an example, gNBs 180a, 180b,
180c may utilize beamforming to transmit signals to and/or
receive signals from the WTRUs 102a, 102b, 102c. Thus,
the gNB 180a, for example, may use multiple antennas to
transmit wireless signals to, and/or receive wireless signals
from, the WTRU 102a. In an embodiment, the gNBs 180a,
180b, 180c may implement carrier aggregation technology.
For example, the gNB 180a may transmit multiple CCs (not
shown) to the WTRU 102a. A subset of these CCs may be
on unlicensed spectrum while the remaining CCs may be on
licensed spectrum. In an embodiment, the gNBs 180a, 180b,
180c may implement Coordinated Multi-Point (CoMP)
technology. For example, WTRU 102a may receive coor-
dinated communications from gNB 180a and gNB 180b
(and/or gNB 180c).

The WTRUs 102a, 102b, 102c may communicate with
gNBs 180a, 180b, 180c using communications associated
with a scalable numerology. For example, the OFDM sym-
bol spacing and/or OFDM subcarrier spacing (SCS) may
vary for different communications, different cells, and/or
different portions of the wireless communication spectrum.
The WTRUs 102a, 102b, 102c may communicate with
gNBs 180a, 180b, 180c using subframe or transmission time
intervals (TTIs) of various or scalable lengths (e.g., contain-
ing varying number of OFDM symbols and/or lasting vary-
ing lengths of absolute time).

The gNBs 180a, 180b, 180c may be configured to com-
municate with the WTRUs 102a, 102b, 102c in a standalone
configuration and/or a non-standalone configuration. In the
standalone configuration, WTRUs 102a, 102b, 102c may
communicate with gNBs 180a, 180b, 180c without also
accessing other RANs (e.g., such as eNode-Bs 160a, 160b,
160c). In the standalone configuration, WTRUs 102a, 102b,
102c may utilize one or more of gNBs 180a, 180b, 180c as
a mobility anchor point. In the standalone configuration,
WTRUs 102a, 102b, 102c may communicate with gNBs
180a, 180b, 180c using signals in an unlicensed band. In a
non-standalone configuration WTRUs 102a, 102b, 102c
may communicate with/connect to gNBs 180a, 180b, 180c
while also communicating with/connecting to another RAN
such as eNode-Bs 160a, 160b, 160c. For example, WTRUs
102a, 102b, 102c may implement DC principles to commu-
nicate with one or more gNBs 180a, 180b, 180c and one or
more eNode-Bs 160a, 160b, 160c substantially simultane-
ously. In the non-standalone configuration, eNode-Bs 160a,
160b, 160c may serve as a mobility anchor for WTRUs
102a, 102b, 102c and gNBs 180a, 180b, 180c may provide
additional coverage and/or throughput for servicing WTRUs
102a, 102b, 102c.

Each of the gNBs 180a, 180b, 180c may be associated
with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced massive mobile broadband (eMBB) access, services for MTC access, and/or the like. The AMF 182a, 182b may provide a control plane function for switching between the RAN 104 and other RANs (not shown) that employ other radio technologies, such as LTE, LTE-A, LTE-A Pro, and/or non-third generation partnership project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In next generation mobile communications and applications for eMBB, massive Machine Type Communications (mMTC), URLLC, or the like, spectrum bands ranging from 700 MHz to 80 GHz may be configured or utilized. Spectrum bands may be licensed, unlicensed, mixed-use, or the like. For sub-6 GHz communications, multiple antenna, MIMO, single user MIMO (SU-MIMO), multi-user MIMO (MU-MIMO), Single Input Multiple Output (SIMO), Multiple Input Single Output (MISO), or the like techniques may be configured or utilized.

Multiple antennas may deliver diversity gain, multiplexing gain, beamforming, array gain, or the like. In configurations where WTRUs communicate to a single central node, MU-MIMO may increase system throughput by communicating multiple data streams to different WTRUs at the same time on the same or overlapping set of resources in time or frequency. For SU-M IMO, the same central node may transmit multiple data streams to the same WTRU rather than multiple WTRUs as for MU-MIMO.

Multiple antenna communication at millimeter wave (mmWave) frequencies may differ from sub-6 GHz. For instance, mmWave frequencies may experience different propagation characteristics. mmWave network devices, base stations, network nodes, WTRUs, or the like may also be configured with a limited number of RF chains compared with antenna elements.

Figure 2:
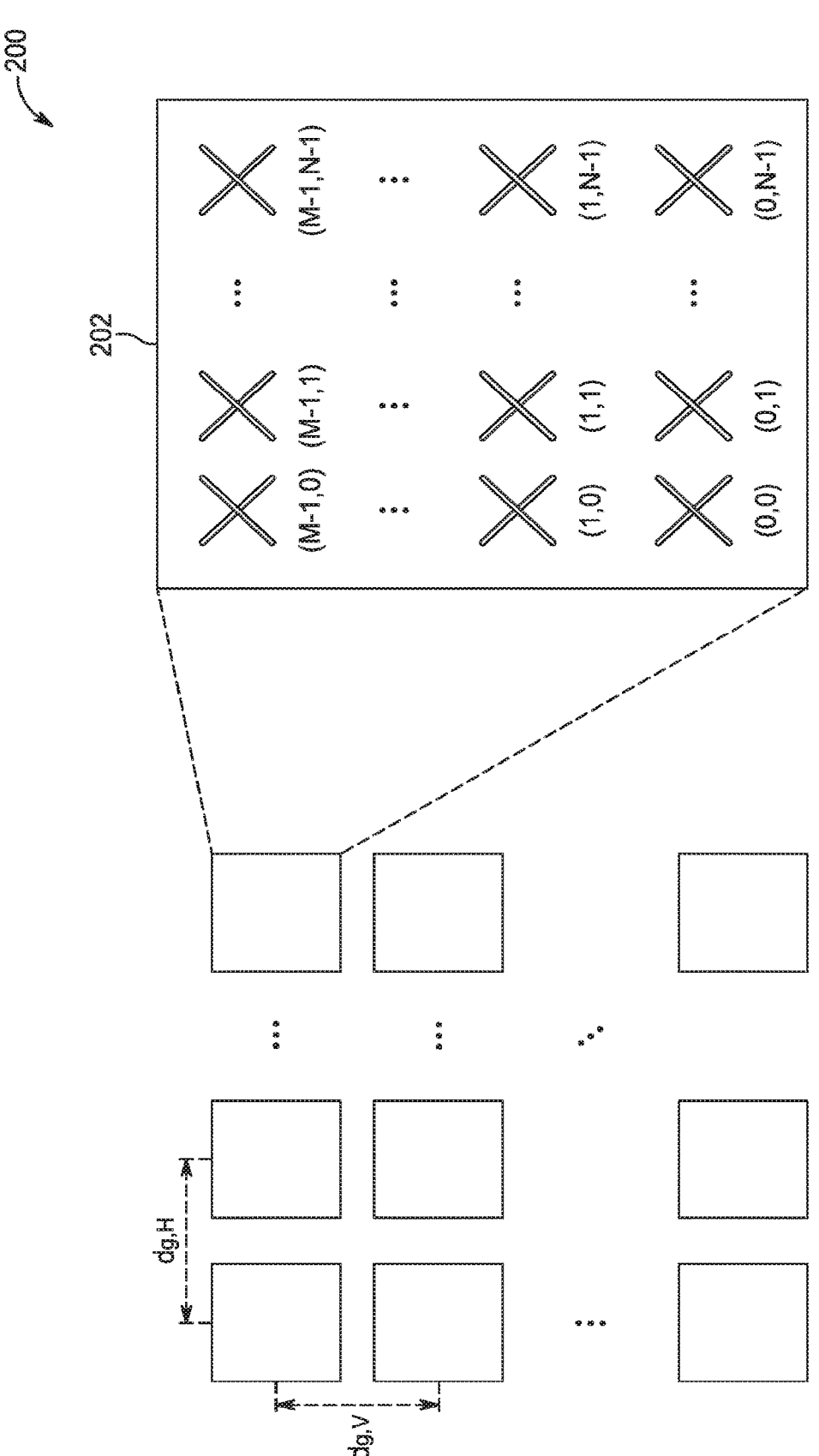
FIG. 2 is diagram of an example of a transmission reception point (TRP) and WTRU antenna model.

FIG. 2 is diagram of an example of a transmission reception point (TRP) and WTRU antenna model 200. A massive antenna model 202 may be configured as Mg antenna panels per vertical dimension and Ng antenna panels per horizontal dimension. Each antenna panel may be configured with N columns and M rows of antenna elements with or without polarization. The timing and phase may be calibrated across panels and multiple panels may be equipped in the same network device, eNB, or the like. A baseline massive antenna configuration may be different according to the operating frequency band as given in Table 1.

TABLE 1

| At 4 GHz | At 30 GHz | At 70 GHz |
|---|---|---|
| Dense Urban and Urban Macro: $(M, N, P, Mg, Ng) =$ $(8, 8, 2, 1, 1)$, $(d_V, d_H) =$ $(0.8, 0.5)\lambda$ | Dense Urban and Urban Macro: $(M, N, P, Mg, Ng) =$ $(4, 8, 2, 2, 2)$, $(d_V, d_H) =$ $(0.5, 0.5)\lambda$, $(d_{g, V}, d_{g, H}) =$ $(2.0, 4.0)\lambda$ | Dense Urban: Baseline: $(M, N, P, Mg, Ng) =$ $(8, 16, 2, 2, 2)$, $(d_V, d_H) =$ $(0.5, 0.5)\lambda$, $(d_{g, V}, d_{g, H}) =$ $(4.0, 8.0)\lambda$ |
| Single Panel 64 Elements per Pol. Total 128 Elements | 4 Panels 32 Elements per Pol. Total 256 Elements | 4 Panels 128 Elements per Pol. Total 1024 Elements |

Precoding at mmWave frequencies may be digital, analog, or a hybrid of digital and analog. Digital precoding may be utilized with equalization to provide SU, MU, or multi-cell precoding. Precoding may be configured such as that in IEEE 802.11n, 802.11x, 3GPP, LTE, or the like. However, in mmWave frequencies, a limited number of RF chains compared with antenna elements and the sparse nature of the channel may add complexity to digital beamforming. Analog beamforming may be configured for limited number of RF chains by using analog phase shifters on one or more antenna elements. Such a technique may be used in IEEE 802.11ad during a sector level sweep, that may identify the best sector, or beam refinement, that may refine the sector to an antenna beam. The technique may also be utilized for beam tracking, that may adjust the sub-beams over time adjusting for changes in channel procedures.

In hybrid beamforming, a precoder may be divided between analog and digital domains. Each domain may have precoding and combine matrices with different structures, such as a constant modulus for combining matrices in the analog domain. Hybrid beamforming may achieve desirable digital precoding performance due to the sparse channel nature and support of multi-user or multi-stream multiplexing. Except for mmWave channels that may be sparse in the angular domain, hybrid beamforming may also be limited by the number of RF chains.

In beam management (BM) for new radio, as frequencies increase, the channel may experience higher path losses and more abrupt changes. In high frequency bands, a large-scale antenna array may be used to achieve high beamforming gain to compensate for the high propagation loss. A coupling loss may be managed for a desired data throughput or coverage. Directional beam based communication may need accurate beam pairing, real channel conditions, angle of arrival and angle of departure in both azimuth and elevation, or the like. Beam direction may be dynamically adjusted with channel change.

BM may include DL layer 1 (L1)/layer 2 (L2) BM procedures for selection of TRP Tx/WTRU Rx beams within one or more TRPs, one or more high level procedures (P-1, P-2, P-3) for beam selection, Tx beam refinement, Rx beam change, TRP Tx and WTRU Rx beam sweep, WTRU-triggered beam failure recovery for NR, beam group based reporting and WTRU-specific configured BM, or the like. BM may also include utilization of a channel state information-reference signal (CSI-RS), synchronization signal or sequence (SS) block configuration for Tx or Rx beam sweeping for BM in NR environments, NW-controlled mechanism for BM for UL transmission(s), or the like.

For physical downlink shared channel (PDSCH) or physical downlink control channel (PDCCH) beam indication, a radio recourse control (RRC) message or signal may configure a set of M candidate transmission configuration indication (TCI) states. A TCI state may include a reference to a RS Set comprising one or more DL RS indices that may be utilized as a quasi-colocation (QCL) reference for either PDSCH or PDCCH reception. In certain configurations, a TCI state may be a pointer for the WTRU to determine which RS set or DL RS index the WTRU may utilize to determine a QCL reference for one or more DM-RS ports associated with a PDSCH or PDCCH.

For PDCCH reception, the QCL reference may be configured by signaling the association of a core resource set (CORESET) or search space to a TCI state. The RS Set linked to the TCI state may provide the QCL reference for the PDCCH. NR may utilize dynamic beam indication for PDSCH that may need an N-bit indicator state or TCI state field in the DL-related DCI field for PDSCH beam indication.

In any of the examples given herein, although NR-PDSCH may be referenced, a PDSCH or any physical or transport downlink shared or data channel may be configured in the given examples. For timing of beam indication for NR-PDSCH, when spatial QCL is configured or indicated, a present TCI field may be located in the associated DCI for NR-PDSCH scheduling independent of same-slot scheduling or cross-slot scheduling. For the examples given herein, a parameter or variable K may be utilized as a threshold, a level, a numerical point, or the like. When the scheduling offset >=threshold K, then NR-PDSCH may use the beam or spatial QCL parameter indicated by the N-bit TCI field in the assignment DCI. When the scheduling offset <threshold K, then NR-PDSCH may use a pre-configured, pre-defined, rule-based, or the like spatial assumption with various QCL parameters that may be obtained from the N-bit TCI state field in the DCI. In certain configurations, threshold K may be based on WTRU capability when one or more candidate values of threshold K are available.

In any of the examples given herein, although NR-PDCCH may be referenced, a PDCCH or any physical or transport downlink control channel may be configured in the given examples. DL Beam indication for NR-PDCCH transmissions may be configured to prevent beam pair link (BPL) blocking. BPL blocking may be caused by a WTRU monitoring NR-PDCCH on different BPLs in different NR-PDCCH OFDM symbols. A QCL configuration may be indicated in a RRC or RRC and MAC control element (CE) (MAC-CE) message or signal. A QCL configuration for NR-PDCCH may include a reference to a TCI state such as when the QCL configuration or indication is on a per CORESET basis. For example, a WTRU may apply a spatial QCL assumption on associated CORESET monitoring occasions or substantially all search spaces within the CORESET may utilize a similar QCL or when the QCL configuration or indication is on a per search space basis. A WTRU may also apply a spatial QCL assumption on an associated search space and where there are one or more search spaces within a CORESET, the WTRU may be configured with different spatial QCL assumptions for different search spaces to monitor NR-PDCCH over multiple different BPL(s) such that overhead is reduced while providing robustness.

In certain configurations, QCL assumption, QCL info, QCL reference, or the like may be associated with various types. For example, types may include: QCL-TypeA of {Doppler shift, Doppler spread, average delay, delay spread}; QCL-TypeB of {Doppler shift, Doppler spread}, QCL-TypeC of {Doppler shift, average delay}; or QCL-TypeD of {Spatial Rx parameter}. A DL beam indication for NR-PDSCH may be included in an N-bit TCI field in a DCI that utilizes a spatial QCL reference to a DL RS, such as a CSI-RS or a synchronization signal block (SSB) for demodulation of a NR-PDSCH or NR-PDCCH. A SSB may also be referred to as a SS block, SS-block, or SS/PBCH. A given value of the indicator may be referred to as an indicator state and may be associated with a DL RS index, the index of a CSI-RS, the index of a SSB, or the like. The DL RS index may be associated with the indicator state through explicit signaling, a RRC message or signal, or a RRC and MAC-CE message or signal. The DL RS index may also be associated with the indicator state implicitly during a WTRU measurement such as when the network configures a subset of DL RSs for measurement by a WTRU. A WTRU may associate a DL RS index and an indicator state based on measurement results.

When a NR-PDSCH scheduling assignment DCI carries a TCI field that provides beam indication or spatial QCL reference indication for NR-PDSCH reception at a WTRU, a scheduling offset or scheduling delay of the corresponding NR-PDSCH allocation may be a consideration. This effect may be due to WTRU time needed to complete TCI decoding, RF tuning, switching from a current Rx beam to the new Rx beam based on a decoded TCI indication, or the like.

A scheduling offset may be N symbols, N time slots, N resources, or the like. A scheduling offset may depend upon whether the corresponding NR-PDSCH allocation is scheduled in the same slot or a different slot as the scheduling assignment DCI. In certain configurations, N may be an integer number that is greater than or equal to 1. The scheduling offset may be smaller, equal, or larger than a pre-specified or configured threshold K, which may be an estimated time duration that the WTRU needs to finish TCI decoding, RF tuning, beam switching from a current Rx beam to a new Rx beam, or the like.

Threshold K may also be a value of estimated time duration for a WTRU performing TCI decoding, blind decoding, RF tuning, beam switching, or the like if a new Rx beam is needed. Blind decoding time may depend on configured frequencies. For example, a WTRU may be configured with higher number of search spaces when operating on higher frequencies. RF tuning time and beam switching time may also be different when operating on higher frequencies.

Threshold K may depend on WTRU capability, network design, WTRU supported numerologies, QoS, WTRU service type such as eMBB, URLLC, MTC, or the like. In certain configurations, URLLC may need a smaller value of threshold K than eMBB for low latency. WTRU capabilities may include WTRU processing time for DCI reception and decoding, WTRU processing time for beam switching, WTRU RF chain tuning time, number of panels equipped and used simultaneously/non-simultaneously, fixed Rx beam configurations, or the like. A WTRU may report the WTRU capability to assist a network device, gNB, TRP, or the like to configure an appropriate scheduling offset or time offset for the reception or demodulation of NR-PDSCH.

Threshold K may be pre-specified, configured, or the like based on a same slot or cross slot scheduling. In same slot scheduling, the value of threshold K may indicate the integer number of symbols or resources. As another example, for cross slot scheduling, the value of threshold K may indicate the integer number of time slots. When a WTRU changes time domain behavior from slot based scheduling to non-slot based scheduling, threshold K may be configured or indicated dynamically. For example, non-slot based scheduling may be a certain symbol duration, and threshold K may be adjusted accordingly and indicated to the WTRU.

In certain configurations, a WTRU may be configured with one or more values of threshold K. The one or more values of threshold K may be pre-specified or configured for different types of service, such as URLLC or eMBB. One or more threshold Ks may be also used simultaneously, persistently, semi-persistently, alternately, or the like. For example, a WTRU may be capable of multiple types of service, such as URLLC or eMBB, simultaneously or alternately where one or more thresholds K may be accordingly configured for multiple services. Each type of service may have similar or different threshold K values.

Threshold K may be configured, selected, determined, calculated, or the like by a network device, gNB, TRP, WTRU, mobile device, or the like. In certain configurations, a WTRU may report information to the network to assist a network device, gNB, TRP, or the like with selection or determination of threshold K. The reported information may include WTRU capability, WTRU operation, WTRU states, current WTRU numerology, custom WTRU settings, or the like. The network may select or determine threshold K and send to the WTRU by higher layer signaling, a higher layer message, a RRC message, a MAC CE, L1 signaling, a DCI, or the like.

A WTRU may determine a value of threshold K in a network controlled environment. For example, one or more threshold Ks may be pre-specified based on the WTRU capability, WTRU category, numerology, traffic type, implementations, or the like. During RRC connection setup, configuration, reconfiguration, or the like, a network and WTRU may exchange capability information and the WTRU may choose the threshold K value. The network may also configure a WTRU with several values of threshold K and the WTRU may select or determine a value of threshold K based on network configurations. Each threshold K may be associated with possible conditions, such as when the value of threshold K is the nearest rounded integer of time by combining TCI decoding time and beam switching time. Once a WTRU chooses threshold K, the value may be reported, signaled, or the like to the network for scheduling resources, such as a subsequent NR-PDSCH allocation.

Threshold K may also be pre-specified or configured to a similar or common value for substantially all WTRUs, a group of WTRUs, WTRU-specific, or the like. In addition, the similar or different threshold K value may be configured to a WTRU based on WTRU capability, WTRU operation, WTRU states, current WTRU numerology, custom WTRU settings, or the like. If the WTRU implements one fixed Rx analog beam, or is incapable of Rx beam sweeping capability, the threshold K may not be configured or the WTRU may disregard the threshold.

Beam indication for a PDSCH or NR-PDSCH may be based on a threshold for a scheduling offset. Selecting the spatial QCL indicated from the TCI state carried in a DCI or following the spatial QCL used for a CORESET with the lowest ID may be performed based on the scheduling offset and threshold Threshold-Sched-Offset. This threshold value may be determined based on WTRU capability, numerology, SCS, or the like.

One or more tables may be specified, pre-configured, configured, or the like to determine threshold K or Threshold-Sched-Offset. These parameters may be based on the dimensions covered in a table(s). One or more tables may be common to a group of WTRUs or WTRU specific. WTRUs may be grouped based on similar capability, QoS, latency requirements, SCS, or the like. Table 2 and Table 3 are examples of determining or selecting threshold K.

TABLE 2

| Beam Indication Latency | Units | 60 kHz SCS | 120 kHz SCS | 60 kHz SCS | 120 kHz SCS | |
| | | CC1/BWP1 | | CC2/BWP2 | | . . . |
|---|---|---|---|---|---|---|
| Low Latency | Symbols or Slots | Value 1 | Value 4 | Value 7 | Value 10 | |
| Medium Latency | Symbols or Slots | Value 2 | Value 5 | Value 8 | Value 11 | |
| High Latency | Symbols or Slots | Value 3 | Value 6 | Value 9 | Value 12 | |

One or more factors may be considered for specific values found in the tables for Threshold-Sched-Offset. For example, a table may comprise two WTRU categories, three SCSs, or three delay requirements. In certain configurations, Table 2 values may be a baseline for substantially all WTRUs. For example, a given WTRU with an operating component carrier/bandwidth part (CC/BWP) and latency requirement with higher SCS, from 60 kHz to 120 kHz SCS, the value may be higher since the time length of 1 symbol/ slot is smaller. The values for low latency and high latency in Table 2 may be similar or different for a given numerology. If the values for high, medium, and low latency WTRUs are similar for substantially all numerologies, then any two of them may be merged or ignored for the baseline WTRU and advanced WTRU.

In Table 3, for a given numerology and latency requirement, support for values in Table 2 may be reported as a WTRU capability. For a given numerology and latency, the value in Table 3 may be equal to or smaller than the value in Table 2.

TABLE 3

| Beam Indication Latency | Units | 60 kHz SCS | 120 kHz SCS | 60 kHz SCS | 120 kHz SCS | |
| | | CC1/BWP1 | | CC2/BWP2 | | . . . |
|---|---|---|---|---|---|---|
| Low Latency | Symbols or Slots | Value 13 | Value 16 | Value 19 | Value 22 | |
| Medium Latency | Symbols or Slots | Value 14 | Value 17 | Value 20 | Value 23 | |
| High Latency | Symbols or Slots | Value 15 | Value 18 | Value 21 | Value 24 | |

A WTRU may follow the specified values defined in tables and report a preferred Threshold-Sched-Offset value. A WTRU reported value may be based on WTRU capability at a given carrier frequency, for each SCS applicable to PDCCH reception at a carrier frequency. In certain configurations, PDCCH reception may comprise DCI decoding and obtaining TCI information carried in the DCI. A WTRU may dynamically switch operation capabilities. For example, for saving energy, a WTRU may switch from advanced mode to baseline mode. A WTRU may initiate or be configured by a network device, gNB, TRP, or the like to work from above 6 GHz to below 6 GHz with SCS switching available from 60/120 kHz to 15/30 kHz.

A Threshold-Sched-Offset may be a parameter associated with different timing delays experienced by a WTRU when performing DCI decoding, obtaining TCI information, beam switching, or the like. A WTRU may report a different Threshold-Sched-Offset value based on a configured number of search spaces and CORESET for a WTRU to monitor, carrier frequency, aggregation level, processing time, or search time during DCI monitoring, for a TCI field carried in DL DCI, or the like. A WTRU may check the activated TCI state table to find QCL information, RS(s), RS(s) in a RS set, or the like. Table checking and processing time may be different when an activated TCI table has invalid information. Time delay needed for beam switching may depend on the carrier frequency or BWP used for PDCCH reception. A received signal may have a different level of signal power difference between a control or data channel, and the AGC gain may converge fast enough for beam switching within similar CC/BWP but converge slowly for beam switching from a beam in CC1/BWP1 to a beam in CC2/BWP2.

For PDCCH blind decoding, timing delays to detect PDCCH format or aggregation may be based on different WTRU hardware capabilities. A WTRU with similar hardware having different configurations of CORESET or search spaces may also result in different processing timings. For example, assuming a similar number of configured CORE-SETs, a WTRU configured with 5 search spaces may need more time for DCI decoding than a WTRU configured with 15 search spaces. DCI decoding time may also be based on a combined value of configurations and WTRU hardware capability. For beam switching, the timing delay may also depend on a combination of WTRU implementations and configurations/operations, such as beam switching within similar or different CC/BWP. In a certain configuration, the value Threshold-Sched-Offset for a WTRU operating on a BWP may be computed as:

$$\text{Threshold-Sched-Offset} = \left\lceil \frac{D - d}{\text{symbol}_{length}} + \delta \right\rceil \text{ symbols.} \qquad \text{Equation (1)}$$

For Equation (1), $\lceil \bullet \rceil$ is a ceiling or round up function that may convert the inside value to the next smallest integer that is larger than the inside value.

Figure 3:
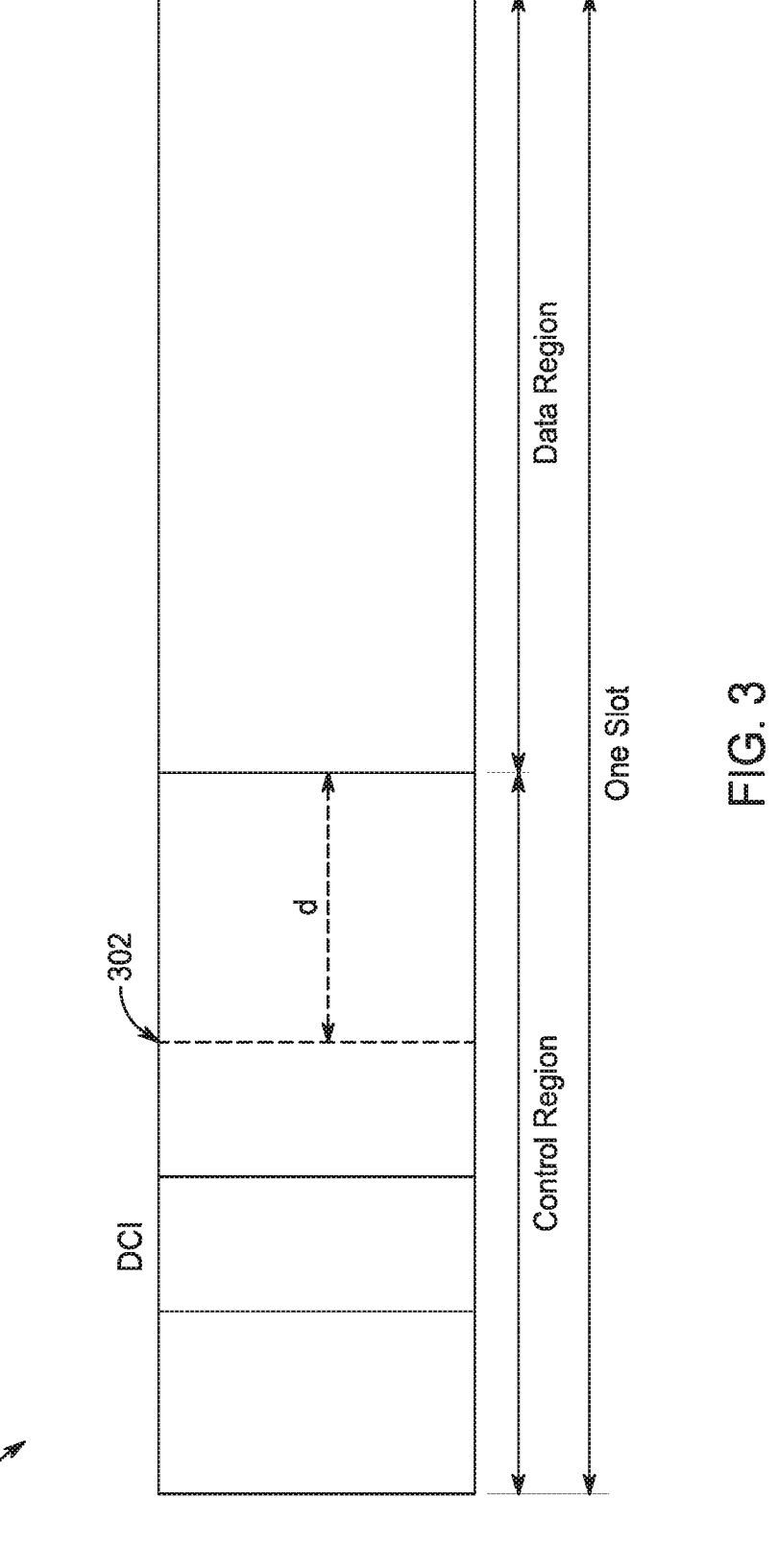
FIG. 3 is a diagram of an example of a slot structure for physical downlink shared channel (PDSCH) beam indication.

FIG. 3 is a diagram of an example of a slot structure 300 for PDSCH beam indication. Variable or parameter d may be the time between the last symbol of substantially all the configured monitored CORESETs or search spaces 302 of a WTRU. Variable or parameter d may be a WTRU reported time length for an estimated time to complete DCI decoding, obtain the TCI information, potential beam switching time, or the like of the WTRU.

Since the WTRU may be unaware of the need for beam switching, such as if PDCCH and PDSCH reception use similar beams that may make switching unnecessary, beam switching time may be a WTRU estimation before the completion of DCI decoding or obtaining the TCI information. A WTRU may also be unaware of beam switching time needed, such as the spatial angle between the old and new beam, during the process of beam switching. Beam switching time may be equal to 0 if no beam switching is needed or a non-zero value if beam switching is needed.

The time to obtain TCI information may depend on WTRU hardware, such as cache access to read a TCI table, or WTRU configurations and may be reported as part of d. The WTRU reported value d may be based on $\mu$ of Table 4 that corresponds to the SCS of the downlink of the transmitted PDSCH. $Symbol_{length}$ may be the time length of each symbol within a slot on a BWP and $\delta$ may be the offset value to compensate or adjust the threshold value.

TABLE 4

| $\mu$ | PDCCH Decoding Time [symbols] |
|---|---|
| 0 (e.g., 30 kHz) | Value 1 |
| 1 (e.g., 60 kHz) | Value 2 |
| 2 (e.g., 120 kHz) | Value 3 |

A Threshold-Sched-Offset or threshold K value may be determined based on the number of configured TCI states. For example, if the number of configured TCI states is less than a first threshold, a first Threshold-Sched-Offset value may be used. If the number of configured TCI states is greater than the first threshold and less than a second threshold, a second Threshold-S ched-Offset value may be used. If the number of configured TCI states is greater than the second threshold, a third Threshold-Sched-Offset value may be used. The second threshold may be larger than the first threshold. A third threshold may exist that is larger than the second threshold. A threshold may be predefined, configured, determined, or the like based on one or more system parameters or WTRU parameters. A Threshold-Sched-Offset value may also be determined based on a number of transmitted SS blocks within a SS burst. The number of transmitted SS blocks may be indicated in a broadcasted message or signal.

A WTRU may report WTRU capability, estimated time duration for one or more of performing DCI decoding, obtaining TCI information, RF tuning and beam switching if a new Rx beam is needed, or the like to assist a network device, gNB, or TRP to configure an appropriate scheduling offset or time offset for the reception and demodulation of PDSCH. A WTRU may receive the scheduling offset or time offset information for PDSCH reception or demodulation after decoding the DCI from the received PDCCH.

The WTRU may determine the beam or spatial QCL parameter for PDSCH reception. If the scheduling offset <threshold K, then the PDSCH may use the beam indicated by the default TCI state that corresponds to the TCI state used for control channel QCL indication for the lowest CORESET ID in a respective slot. If the scheduling offset >=threshold K, then the PDSCH may use the beam or spatial QCL parameter indicated by the N-bit TCI field in a DCI used or assignment. In these examples, threshold K may be variable or parameter Threshold-Sched-Offset.

In certain configurations, the WTRU may switch to a different beam if the WTRU uses a different beam for PDCCH reception and PDSCH reception. Otherwise, the WTRU uses the current beam without switching. The WTRU may receive a PDSCH after applying the determined beam. If a NR-PDSCH is scheduled and transmitted over a new beam before the WTRU decodes a DCI or TCI and switches to a new needed Rx beam, the first few symbols of the NR-PDSCH allocation may be improperly buffered impairing subsequent data decoding. If the scheduling offset of a corresponding NR-PDSCH, that may be indicated by the scheduling assignment DCI, is equal or bigger than the threshold K, NR-PDSCH may use the beam or spatial QCL assumption indicated by the N-bit TCI in the assignment DCI. If the scheduling offset of a corresponding NR-PDSCH, that may be indicated by the assignment DCI, is smaller than the threshold K, the WTRU may apply a suitable Rx beam from the starting symbol of the scheduled NR-PDSCH. This operation may avoid loss of NR-PDSCH symbols scheduled before the threshold K.

A specific beam may be pre-configured so that the WTRU may switch to the pre-configured beam to buffer the first few symbols of a NR-PDSCH. The information for a WTRU to switch to the specific beam and the time a WTRU needs to receive and buffer on the specific beam, may be pre-configured and known to the WTRU in advance. The pre-configured beam may be WTRU specific, common to a group of WTRUs, or may be set for substantially all WTRUs within a cell or area. The pre-configured beam may be configured through higher layer signaling such as RRC, obtained by a WTRU through system information via broadcast, specifically requested, or the like. The preconfigured beam may be set as a default beam after initial configuration and reconfigured at a later time as needed.

A WTRU may apply a suitable Rx beam by various operations without using a pre-configured beam, default beam, or the like. For example, a WTRU may use a similar beam used for receiving the DCI or NR-PDCCH in the same slot or a similar beam used for receiving the NR-PDCCH or NR-PDSCH in previous slots as a suitable Rx beam. For example, assuming the current slot is X, a WTRU may use similar beam used in the previous slot Y for NR-PDCCH, where the Y<=X and the slot difference is $\beta$=X−Y. In this configuration, the value of $\beta$ may be configurable. To reduce signaling overhead, a WTRU may be configured to use a suitable Rx beam continuously or for a time period in future NR-PDSCH transmissions. This configuration may or may not indicate a Rx beam for a WTRU to receive NR-PDSCH symbols before the threshold K.

A WTRU may use a semi-persistent beam, such as when a Tx or Rx beam for NR-PDSCH changes slowly or infrequently making indication of the beam in every scheduled NR-PDSCH unnecessary. As an example, a spatial QCL assumption or a beam sent to a WTRU at timeslot t1 may be reused by the WTRU to receive a plurality of subsequent scheduled NR-PDSCH allocations until a condition is satisfied. For low overhead, a spatial QCL assumption may be indicated to the WTRU by using DCI or ICI. For high reliability, higher layer signaling may be utilized to indicate a spatial QCL assumption. A condition may be the same spatial QCL assumption or a beam reused to receive N subsequent scheduled NR-PDSCH allocations, where N may be configurable or carried together with the QCL indication, such as a WTRU may be configured with a parameter aggregationFactorDL>1. In this configuration, a WTRU may use the indicated beam for aggregationFactorDL consecutive slots. Another condition may be a timer configured with each spatial QCL assumption. When the timer expires, spatial QCL assumptions may become invalid. A new spatial QCL assumption may also be a condition indicated or configured that may directly overwrite the old spatial QCL assumption. A default spatial QCL assumption may also be a condition that may be used in some or substantially all of the aggregationFactorDL slots.

A WTRU may obtain suitable Rx beam information based on pre-defined rules. A pre-defined rule may be triggered by associated parameters such as WTRU speed, WTRU traffic load, current numerology, or the like. Each triggered rule may result in beam changes within a specific beam determination operation such as a switch from one preconfigured beam to another reconfigured beam. A triggered rule may also apply across different beam determination operations, such as from a semi-persistent beam to a NR-PDCCH beam or a last NR-PDSCH beam. A WTRU may also use a preconfigured beam initially and switch to use a semi-persistent beam with WTRU movement. A persistent duration may be related to WTRU speed and configured or indicated as a certain period or a timer in a DCI, a MAC-CE message or signal, a RRC message, or the like. For a high speed WTRU, a smaller period or shorter timer may be configured. For a low speed WTRU, a larger period or longer timer may be configured.

Once the WTRU receives the spatial QCL assumption indicated in a DCI, it may be used for the reception of NR-PDSCH for a certain period, until a timer expires, or a new DCI with beam indication is received. For a high speed case, a WTRU may use wide beam and a single fixed Rx beam or omni-directional beam. In this configuration, a WTRU may also use a similar beam for NR-PDCCH reception to receive NR-PDSCH to reduce overhead or latency. A WTRU may also switch operation from slot based mode to non-slot based mode. In slot based mode, the WTRU may use a similar Rx beam to receive NR-PDSCH to receive the CORESET or NR-PDCCH. In non-slot based mode, the WTRU may use the Rx beam indicated by one previous DCI containing beam indication. For example, the previous DCI may be last DCI with beam indication or the Rx beam for the reception of the last NR-PDSCH.

A beam assumption may exist for a multi-slot PDSCH. When a WTRU is configured with a high layer parameter PDSCH-AggregationFactor, which may correspond to the PHY layer parameter aggregationFactorDL, and the value of the parameter is larger than 1, then the WTRU may use a default beam instead of the indicated beam for PDSCH reception. The default beam may be utilized in part of or substantially all of the configured aggregationFactorDL consecutive slots.

Figure 4:
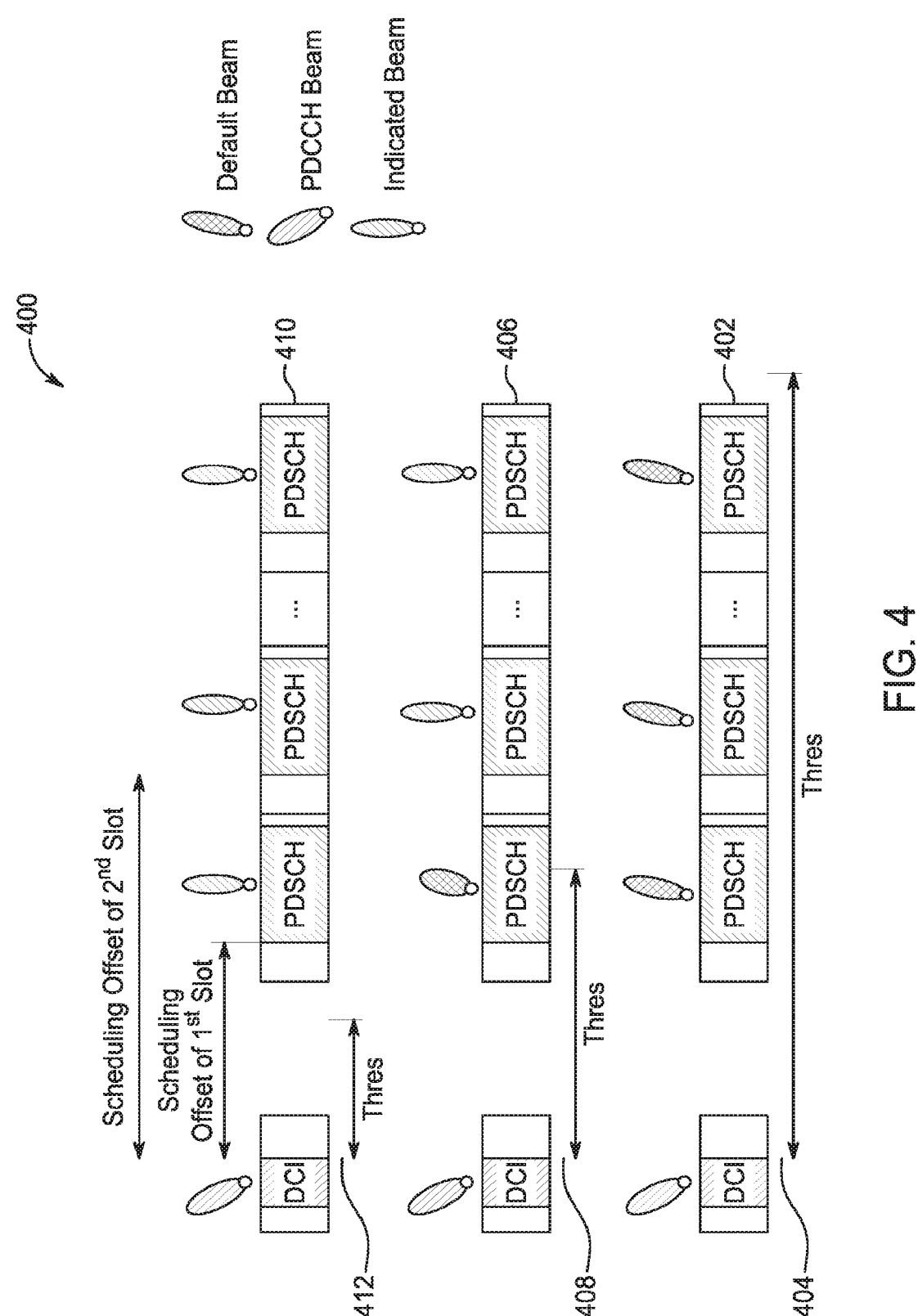
FIG. 4 is a diagram of an example of a quasi-colocation (QCL) assumption for a multi-slot PDSCH configuration.

FIG. 4 is a diagram of an example of a spatial QCL assumption for a multi-slot PDSCH configuration 400. Although a PDSCH(s) is referenced in FIG. 4, a NR-PDSCH(s) may similarly apply or be substituted. There may be a threshold value before a WTRU obtains and applies the indicated beam such as due to DCI decoding or RF tuning time. If multi-slot PDSCH 402 is scheduled with slot aggregation and the scheduling offset of the scheduled PDSCH in the first scheduled slot is less than threshold value 404, the spatial QCL assumption, spatial Rx parameter, Rx beam or the like used for PDSCH reception may be based on a default assumption, predefined rules, or the like. As another example, a WTRU may also keep using a similar default beam for substantially all scheduled slots even if the configured aggregationFactorDL consecutive slots are spanned across a threshold.

In multi-slot PDSCH 406, a WTRU may apply a default beam for PDSCH reception for the slot where the first symbol of the scheduled PDSCH is less than threshold value 408, and then may apply the indicated beam for all subsequent scheduled slots where the first symbol of the scheduled PDSCH is later than threshold value 408. In multi-slot PDSCH 410, an indicated beam may be utilized for each PDSCH when the scheduling offset of $1^{st}$ slot and $2^{nd}$ slot is greater than threshold 412.

The default beam may be the beam utilized to receive a specific CORESET, such as the CORESET with the lowest ID configured within a similar CC/BWP as the scheduled PDSCH, in the same slot that the WTRU receives scheduling in a DCI, the same slot as the WTRU receives the 1st scheduled PDSCH, the slot when the WTRU receives each scheduled PDSCH, or the like. A default beam applied for PDSCH reception in each scheduled slot may be similar or different for aggregationFactorDL consecutive slots.

In each scheduled slot, the WTRU may use a similar beam as that used for reception of a specific CORESET in that slot. For example, in one scheduled slot, the WTRU may use beam X as the default beam for PDSCH reception in that slot and in another scheduled slot the WTRU may use beam Y as the default beam for PDSCH reception. Beam X and Y may be determined since the WTRU may be configured with those two beams respectively for PDCCH reception in each slot. Beam X and Y may also be determined since the two beams are used for monitoring the CORESET with a specific ID, such as lowest ID or default ID, within a similar BWP. In certain configurations, even if in some or substantially all of the configured aggregationFactorDL consecutive slots the scheduled PDSCH is transmitted after the threshold value, the WTRU may be configured to use a default beam instead of an indicated beam.

If the measurement of an indicated beam indicates that the beam quality, such as layer 1 Layer 1 reference signal received power (L1-RSRP), L1 reference signal received quality (L1-RSRQ), L1 signal-to-noise and interference ratio (L1-SINR), or the like is below a configurable threshold, the WTRU may use a default beam for PDSCH reception in one or more scheduled slots for the aggregationFactorDL consecutive slots. The default beam for this configuration may be a similar or a different beam compared to the default beam specified for the case where the scheduling offset of PDSCH in a slot is less than the threshold value.

A predefined rule may specify that the WTRU use a specific beam. For example, for load balancing or congestion detected for the indicated beam, a WTRU may switch to a default beam. When a WTRU is traveling at high speed, a default wide beam may be used, such as a beam indicated by a SSB index. Where the WTRU is configured with one or more panels, to avoid interferences between different panels the WTRU may select a specific beam for each panel instead of the indicated beam.

If the WTRU performs BWP switching due to PDCCH reception in different slots, the BWP switching delay may be accounted for before beam switching. For example, at a time slot n, if the WTRU uses beam X to receive PDCCH at BWP 1, and the default beam or indicated beam is beam Y, then the WTRU may use beam X. A WTRU may be configured to operate in this manner since switching to beam Y involves a BWP switching from BWP 1 or another BWP, such as BWP 2, for PDSCH reception.

Similar to certain configurations for default beam determination for each slot of a multi-slot PDSCH transmission, an indicated beam may also be determined for each slot. An indicated beam may be the same or different in some or all of the configured aggregationFactorDL consecutive slots. If the number of the indicated beams for multi-slot PDSCH is more than one, the indicated beams may be from the same TRP or different TRP. This configuration may be desirable for coherent joint transmission, beam diversity, or the like for PDSCH transmissions. Since indicated beams may have narrow beam widths, and beam availability may be dynamically changed due to moving obstacles, interference, UE rotations, movement, dynamic blockage, or the like. Robustness and reliability may be considered and achieved by indicating multiple beams, beam diversity, or the like applied in aggregationFactorDL consecutive slots for PDSCHs in multi-slot transmission. When the indicated beams within the aggregationFactorDL consecutive slots are from the same TRP or different TRPs, latency may be a factor as it may affect the determination of the threshold value Threshold-Sched-Offset.

In certain configurations, parameter or variable Threshold-Sched-Offset may be determined by a reported WTRU capability. When a WTRU switches to a specific beam, default beam, indicated beam, or the like it may be based on BWP switching, variable bwp-SwitchingDelay, quality evaluation of the target beam, interference avoidance, WTRU capability, or the like. If the default beam or indicated beam is unsuitable based on one or more factors, a WTRU may omit the PDSCH reception in one or more of the aggregationFactorDL consecutive time slots.

For PDSCH, the QCL reference may be dynamically indicated by a TCI field in DCI. For PDCCH, the QCL reference may be semi-statically configured by a reference to a particular TCI state. DL RS in the RS set used for spatial QCL purposes may be dynamically initialized and updated based on WTRU measurements or reports. Spatial QCL assumptions may be updated due to WTRU mobility, WTRU rotation, WTRU traffic load, beam congestion status, beam blockage, change of WTRU active band width part(s), change of WTRU component carrier(s), or the like.

A spatial QCL assumption update may be explicit, implicit, or event triggered. An explicit update may contain a reference to a periodic or semi-persistent DL RS, CSI-RS, SSB, or the like that may be updated and sent by the network based on the latest WTRU beam measurement reporting by RRC, RRC and MAC-CE signaling, or the like. An explicit update may be network initiated or WTRU initiated.

An implicit update may be performed by the network, TRP, gNB, or the like including signaling that triggers an aperiodic beam measurement on a periodic, semi-persistent, or aperiodic DL RS, CSI-RS, SSB, or the like. Upon receiving the measurement trigger, the WTRU may update the QCL reference based on pre-defined operations or rule based beam determinations. An event triggered update may include when the WTRU experiences a larger traffic loading or traffic congestion on a beam such that the pre-defined beam may not sustain capacity requirements or the WTRU cannot use a similar beam for receiving a NR-PDCCH.

A spatial QCL assumption update for NR-PDSCH reception before TCI decoding or beam switching may be performed. In certain configurations, a WTRU may be pre-configured with a beam X to receive the NR-PDSCH symbols scheduled before the WTRU completes DCI decoding to obtain the TCI or spatial QCL information during a transition period (TP) before the beam indicated by the N-bit TCI field in an assigned DCI is applied. The TP may be utilized for NR-PDSCH reception and may indicate the time for WTRU DCI decoding, TCI decoding, RF tuning, beam switching, or the like if a new Rx beam is scheduled for NR-PDSCH.

Figure 5:
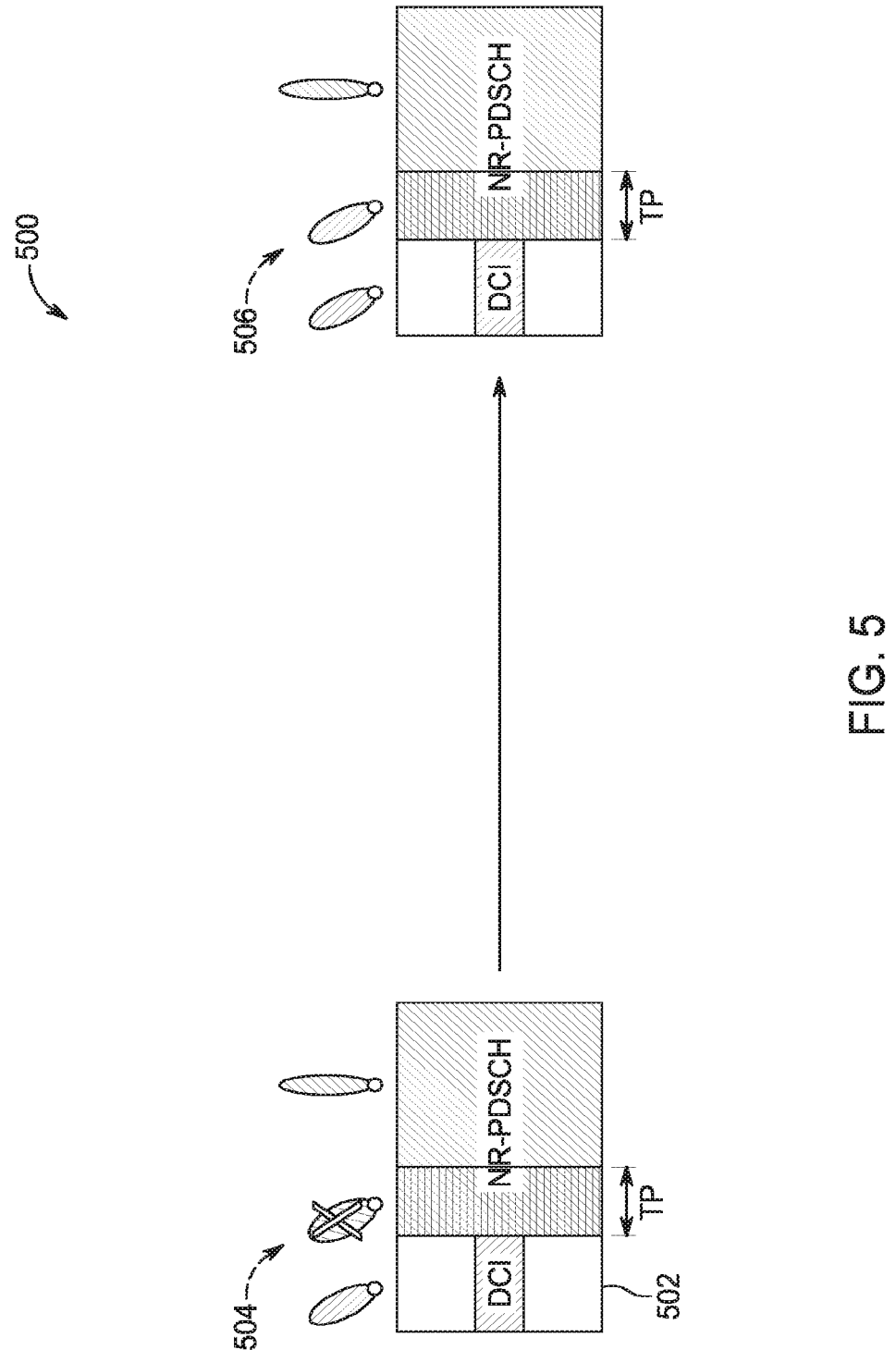
FIG. 5 is a diagram of an example of a spatial QCL assumption update for a new radio PDSCH (NR-PDSCH) configuration.

FIG. 5 is a diagram of an example of a spatial QCL assumption update for a NR-PDSCH configuration 500. A network device, gNB, TRP, or the like may send an explicit update to the WTRU with a new QCL reference. In 502, the QCL reference used for the TP may become invalid or a pre-configured beam 504 may be blocked. A beam may be blocked due to WTRU rotation, movement, or the like. A WTRU may use a similar beam 506 as the beam used to receive the assignment DCI, PDCCH, NR-PDCCH, or the like. To recover or update the QCL reference for NR-PDSCH reception during a TP or subsequent scheduled NR-PDSCH(s) reception, the spatial QCL assumption update for NR-PDSCH reception may involve the network sending an explicit update spatial QCL assumption to the WTRU based on the latest beam measurement reporting. The WTRU may also detect beam failure on the pre-configured beam and request the network to send an explicit update spatial QCL assumption for the reception of NR-PDSCH during a TP.

Figure 6:
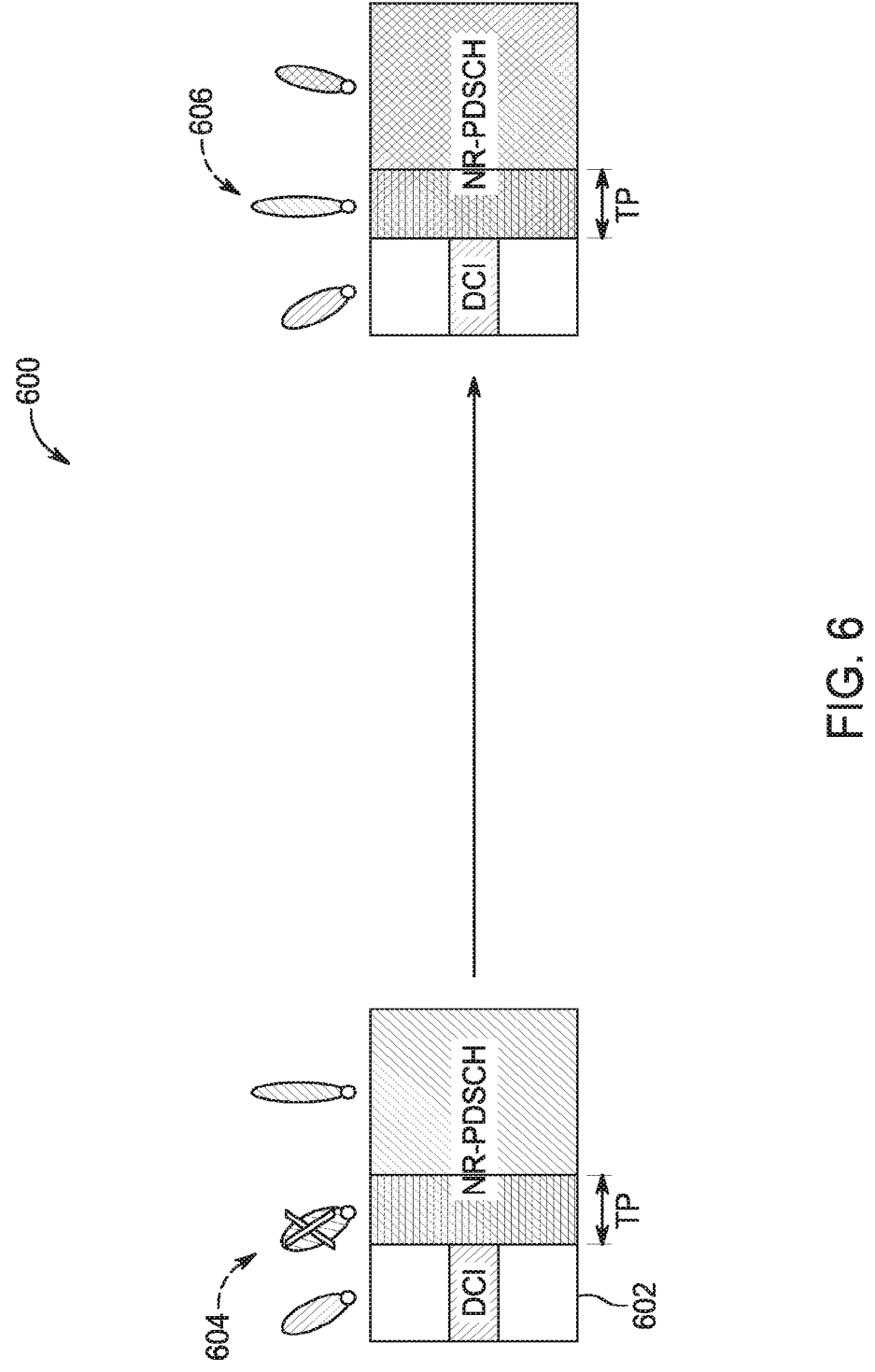
FIG. 6 is a diagram of an example of a spatial QCL assumption update for a NR-PDSCH configuration.

FIG. 6 is a diagram of an example of a spatial QCL assumption update for a NR-PDSCH configuration 600. An event triggered update may be used for spatial QCL assumption for NR-PDSCH reception. In 602, the QCL reference used for the TP becomes invalid or a pre-configured beam 604 may be blocked. Based on a certain pre-specified or configured event triggering, such as PDCCH beam congestion or the like, the WTRU may automatically decide a new QCL reference 606 according to previously configured rules, such as a rule configured by the network in earlier time, a RRC configuration, or the like. A spatial QCL assumption update for NR-PDSCH reception may use a similar beam as that used to receive the last NR-PDSCH allocation. This may be performed on a condition that the beam has a L1-RSRP, SINR, or block error rate (BLER) above a certain threshold during the last or previous measurement(s). In 600, the WTRU may send feedback of the determined beam to the network.

Figure 7:
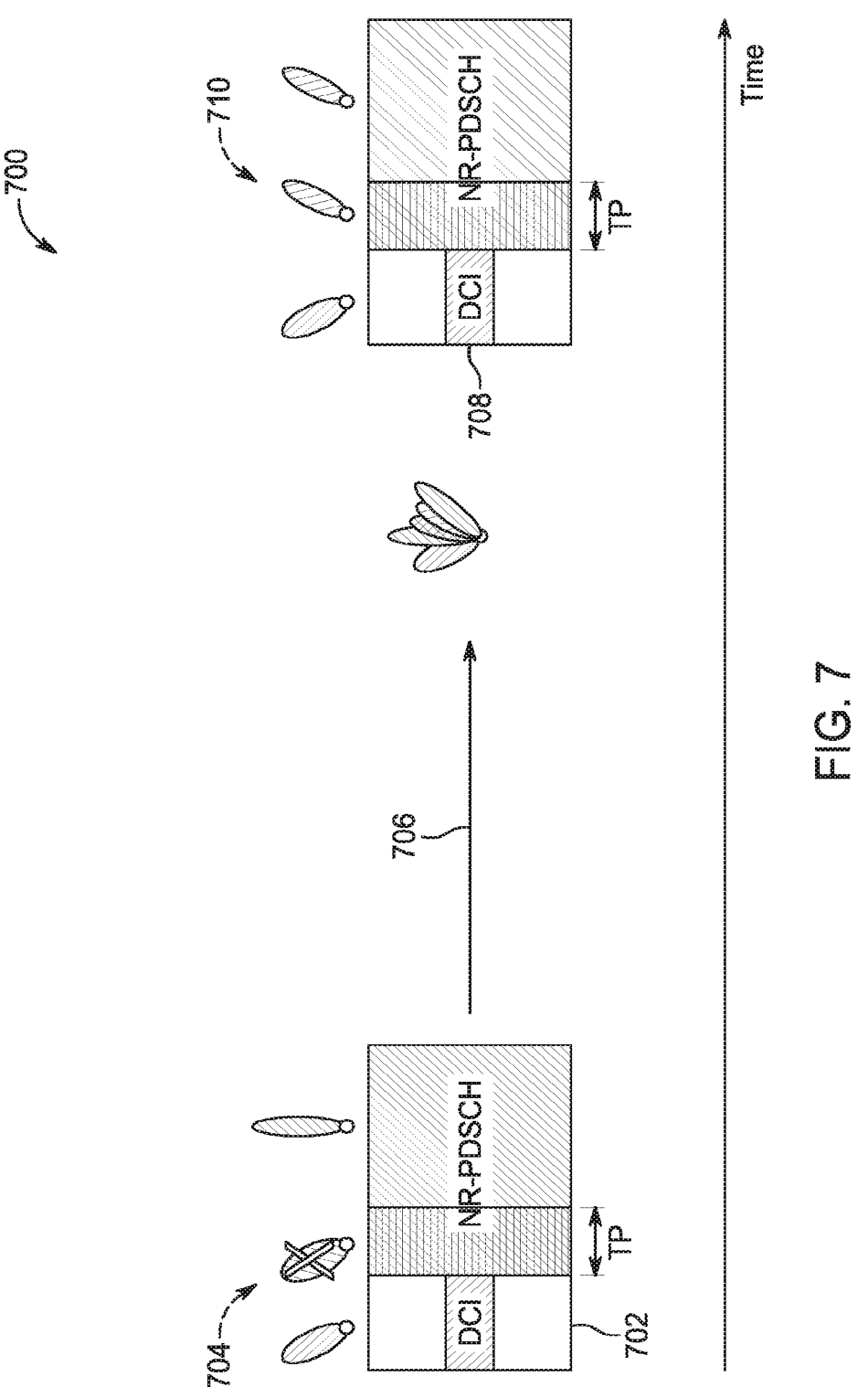
FIG. 7 is a diagram of another example of a spatial QCL assumption update for a NR-PDSCH configuration.

FIG. 7 is a diagram of an example of a spatial QCL assumption update for a NR-PDSCH configuration 700. A network device may implicitly recover and update the WTRU's QCL reference for NR-PDSCH. In 702, a spatial QCL assumption update for NR-PDSCH reception may assume the QCL reference used for the TP becomes invalid or a pre-configured beam 704 may be blocked. A network may send a trigger signaling, such as with RRC, MAC-CE, or DCI to the WTRU with or without configured RS resources, such as certain aperiodic CSI-RS resources specifically configured for the WTRU to recover from an invalid QCL reference. With a trigger signaling, the WTRU may perform beam measurement and reporting on aperiodic RS resources, such as a CSI-RS, and update of a QCL reference that may be used to receive future NR-PDSCH allocations that are scheduled during the TP. The updated QCL reference may be sent to the network, so that the network may use the updated QCL reference to transmit NR-PDSCH allocation within the TP.

An updated QCL reference 706 may implicitly or explicitly be applied for NR-PDCCH, NR-PDSCH, or the like. In implicit applications, the WTRU may apply the updated QCL reference directly for the following NR-PDCCH in subsequent slots. The WTRU may also apply the updated QCL reference directly for a NR-PDSCH in the current slot or within or outside the TP of NR-PDSCH or subsequent slots. In explicit applications, the WTRU may rely on explicit signaling to extend the updated QCL reference for NR-PDSCH allocation within the TP to NR-PDCCH or NR-PDSCH in subsequent slots. Explicit and implicit update of a spatial QCL reference or assumption for the reception of NR-PDCCH or NR-PDSCH may also be configured in combination.

After a WTRU successfully decodes a TCI or DCI 708, it may apply the Rx beam 710, such as a spatial QCL parameter, indicated in the TCI field in the associated DCI or in the assignment DCI for the reception or demodulation of a scheduled NR-PDSCH. A WTRU may also continue applying the beam used during the TP to the subsequent scheduled NR-PDSCH. In addition, a WTRU may use a similar beam as the WTRU receives scheduling in a DCI or NR-PDCCH in the same slot. The WTRU may also use a similar beam as the WTRU receives the NR-PDCCH or NR-PDSCH in the previous slots. If a WTRU incorrectly decodes a TCI or DCI, the decoding error of current NR-PDCCH may result in failures in the reception of NR-PDSCH. For this scenario, the WTRU may continue applying the beam used during TP to the following NR-PDSCH.

Figure 8:
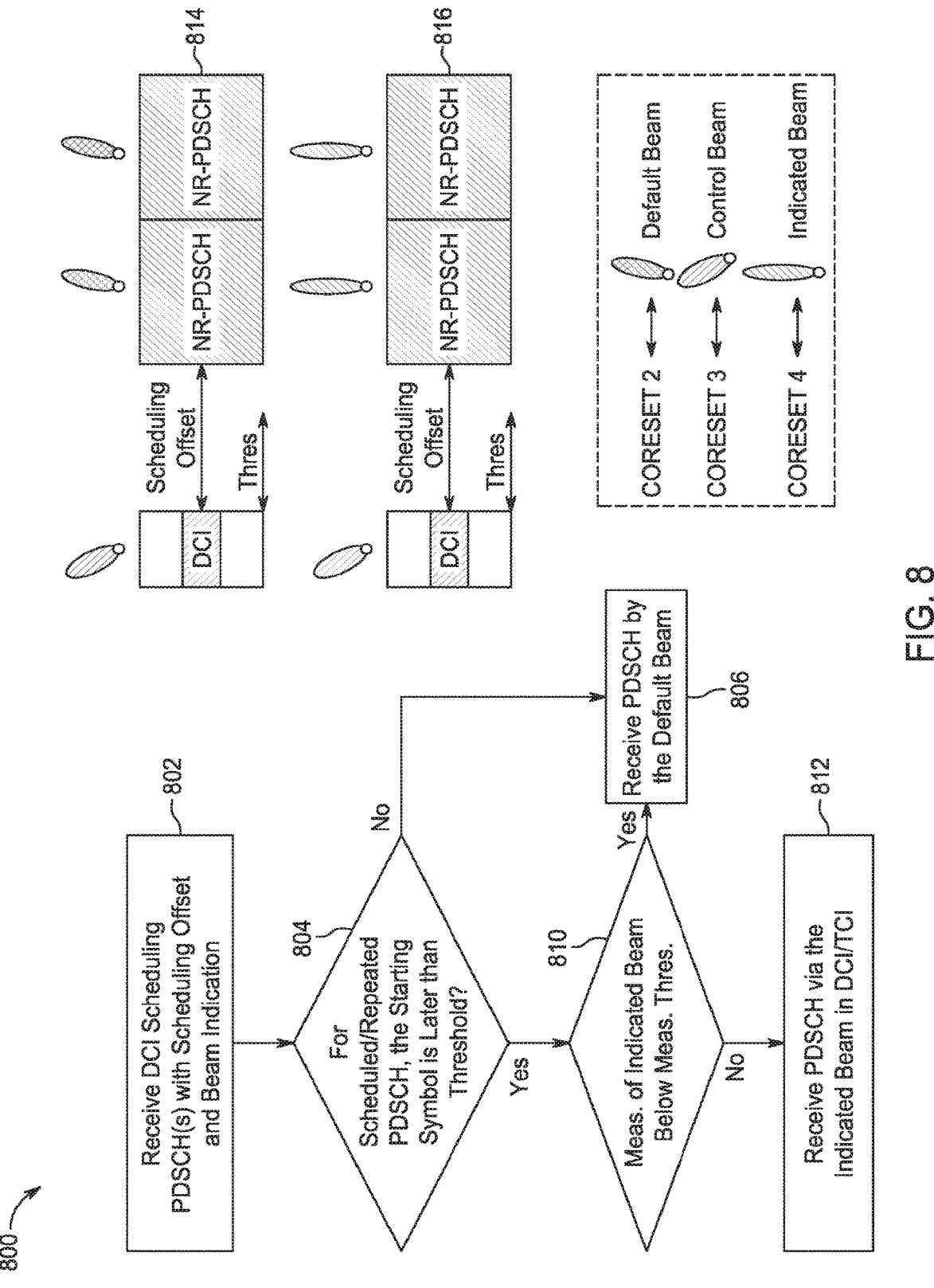
FIG. 8 is an example of a procedure for determining a beam for PDSCH communications.

FIG. 8 is an example of a procedure for determining a beam for PDSCH communications 800. Although a PDSCH(s) is referenced in FIG. 8, a NR-PDSCH(s) may similarly apply or be substituted. Initially, a WTRU may receive a DCI scheduling a PDSCH(s) indicating a scheduling offset and a beam indication (802) for PDSCH reception. For a scheduled or repeated PDSCH, if the starting symbol is not later than a threshold (804), then the WTRU may use a default beam to receive the PDSCH (806). The default beam may be the beam for the WTRU to receive the reference CORESET. The reference CORESET may be the 1st CORESET within a similar CC/BWP as the scheduled PDSCH when one or more CORESETs are configured in that slot and CC/BWP.

If the starting symbol is later than the threshold, then the WTRU may use the indicated beam to receive the PDSCH when the measured quality, such as L1-RSRP, L1-RSRQ, or L1-SINR, of the indicated beam (810) is above a measurement threshold (812), or the WTRU may use a default beam to receive the PDSCH when the measured quality of the indicated beam is below the measurement threshold (806).

If multi-slot PDSCH with slot aggregation is configured, in the case that the one or more scheduled slots are spanning across the threshold value, the WTRU may apply a default beam for the scheduled slots instead of performing a determination for each scheduled or repeated PDSCH. For example, if the starting symbol of the first scheduled PDSCH is less than a threshold value, the WTRU may apply a default beam for substantially all aggregationFactorDL consecutive slots. Otherwise, the WTRU may apply the indicated beam or one or multiple indicated beams for substantially all aggregationFactorDL consecutive slots. In addition, with slot aggregation the default beam used for each scheduled slot may be similar using the same default beam as the PDSCH reception in the first slot or different where the default beam is determined at the beginning of each scheduled slot.

In 814 or 816, if the scheduling offset of a PDSCH is smaller than a threshold, the WTRU may apply the default beam or TCI state associated with a reference CORESET. The reference CORESET may be at a predefined location within the configured CORESETs, such as the first CORESET in the configured CORESETs, for NR-PDSCH reception in the slot. The reference CORESET may also be the latest time location, such as closest to the NR-PDSCH region.

A WTRU may be RRC configured with M TCI states per network device, per TRP, per gNB, per BWP, per cell, or the like depending on WTRU capability. Before a RRC configured TCI state is used or indicated by the DCI carrying the TCI indication, a subset of the RRC configured M TCI states may be selected and activated by a MAC-CE message or signal. If the value M, number of RRC configured TCI states, is larger than the largest configurable subset size, a selection message or command such as MAC-CE may be used. However, if the value of M is equal to or smaller than a certain size different operations may be performed by the WTRU.

A WTRU may wait for an activation or selection command. For example, if M=7, MAC-CE may be needed to select a smaller number, such as 2, to reduce the possible overhead for the WTRU to monitor beam indication. If the number of activated TCI states is small, a smaller number of the activated TCI states information may be stored in cache, with lower latency and low power during TCI state data access. When selection or activation of a subset of TCI states is unneeded, a WTRU may not need to wait for a selection or activation command such as MAC-CE.

A TCI state selection or activation timer may be defined or specified and configured by a higher layer message, RRC message, indicated in system information, or the like. If a WTRU does not receive a selection or activation command before or during a time period of a timer, the WTRU may assume that the selection or activation command is unnecessary and substantially all the M configured TCI states may be considered as activated.

When beam failure occurs, previously configured or activated TCI states may become invalid for a time duration until the reconfiguration, reactivation, or the like of one or more TCI states. A default TCI may be defined for a WTRU's reception of a PDSCH or PDCCH. For PDCCH reception after beam failure, the WTRU may monitor dedicated control channel CORESETs during beam failure recovery. When the WTRU is reconfigured by the network to another CORESET for receiving a dedicated PDCCH and activated by a MAC-CE message or signal with a TCI state if the configured CORESET has K>1 configured TCI states, the WTRU may then monitor the new configured CORESET based on the activated TCI state. Instead of reconfiguration or reactivation, the WTRU may also be re-indicated by the network to another TCI state(s) by a MAC-CE before beam failure.

During initial RRC configuration or subsequent RRC reconfigurations, a WTRU may be configured with updated TCI states. Configured, reconfigured, updated, or the like TCI states may be activated by subsequent MAC-CE messages or signals. During the period between RRC configuration, reconfiguration, update, or the like of the TCI states and subsequent MAC-CE activation of the TCI states, a default or fallback spatial QCL reference may be needed for PDCCH reception.

A TCI state activated and used before RRC reconfiguration or update may be utilized for a PDCCH until the reception and application of the new MAC-CE activation, deactivation, reactivation, or the like command. A specific new RRC configured, reconfigured, updated, or the like TCI state may be used for PDCCH reception, such as the lowest entry of the new RRC TCI states.

The most recent TCI state and DL RS may be activated by a MAC-CE in any of the existing CORESETS and may be used for QCL spatial reference for PDCCH reception until application of the new MAC-CE activation, deactivation, reactivation, or the like command. If the most recent activated TCI state or DL RSs is more than one, the DL RS activated for a specific CORESET may be used. For example, the DL RS for the CORESET with lowest CORESET ID may be used, wherein the lowest CORESET ID may be the lowest CORESET ID number except '0' or the lowest CORESET ID within the CORESETs in the same BWP.

Once a TCI state for PDCCH reception is determined, such as by TCI reconfiguration or reactivation for PDCCH, the TCI states for PDSCH reception may also be needed. A WTRU may assume demodulation reference signal (DMRS) of PDSCH is spatial QCL'ed with the DL RS of the WTRU-identified candidate beam in the beam failure recovery request. In this case, TCI states may not be needed, by using the assumed QCL relation with the DL RS of the WTRU-identified candidate beam in the beam failure recovery request for PDSCH reception.

If TCI state reconfiguration and activation or selection for PDSCH is completed, the WTRU may rely on the DCI or TCI message for PDSCH reception. If the offset between the reception of the DL DCI and the corresponding PDSCH is equal to or greater than a threshold Threshold-Sched-Offset, the WTRU may use the TCI indicated in the DCI. If the offset is smaller than the threshold Threshold-Sched-Offset, the WTRU may assume that the antenna ports of one DM-RS port group of a PDSCH of a serving cell are QCL-ed based on the TCI state used for PDCCH QCL indication of the lowest CORESET-ID in the latest slot in which one or more CORESETs are configured for the WTRU.

If the TCI state reconfiguration is completed but the activation or selection for PDSCH is in progress, the WTRU may not rely on the indication of TCI by DCI since RRC configured TCI states may yet be activated. For this configuration, the WTRU may use the similar TCI state that is activated for PDCCH reception. The WTRU may also use the default TCI state corresponding to, for example, the first TCI state in the RRC configured PDSCH TCI states, or the similar TCI state for PDSCH reception from the previous or latest reception.

One or more control channel CORESETs may be configured for a WTRU to monitor and each CORESET may be configured with one or more QCL parameters, such as spatial Rx parameters, to indicate or determine an associated downlink signal, such as a CSI-RS or SS block, for downlink beam indication. A QCL association between a downlink channel, CORESET, PDCCH, PDSCH, or the like and a downlink reference signal, CSI-RS, SS block, or the like may be used to indicate a downlink beam or receive beam to use for downlink channel reception. If one or more downlink channels use a similar beam, then one or more downlink channels may be associated or QCL-ed with the same downlink reference signal.

A WTRU may be configured to monitor one or more CORESETs in a slot. One or more CORESETs in a slot may be associated with a similar downlink beam, a same CSI-RS resource, a same SS block, or the like. If the one or more CORESETs are associated with the similar downlink beam, such as associated with the same downlink reference signal, the CORESETs may be configured in similar or different time locations. CORESETs may be located, allocated, transmitted, or monitored in different frequency locations. CORESETs may also be configured in the similar time location, same OFDM symbol, or the like. One or more CORESETs in a slot may be associated with a different downlink beam, different CSI-RS resources, SS blocks, or the like. If the one or more CORESETs are associated with a different downlink beam, the CORESETs may be configured in a different time location within a slot, symbol, symbol group, or across different slots.

As a default beam for a NR-PDSCH reception, a WTRU may be configured with the same beam with its associated CORESET. A default beam may be used if the scheduling offset is smaller than a threshold or a default beam may be used for a period where a WTRU receives its associated DCI. Such a period may be predefined, configured, or implicitly determined based on one or more system parameters, SCS, slot length, number of symbols for scheduling, or the like. When a WTRU uses a default beam to receive a NR-PDSCH and the default beam is a beam similar to an associated CORESET, the WTRU may use or assume one or more QCL parameters for the NR-PDSCH that may be similar as the one or more of QCL parameters for its associated CORESET.

If one or more CORESETs are configured to monitor for NR-PDSCH scheduling and the CORESETs are associated with a similar beam, QCL-ed with the same downlink reference signal, or the like, the default beam for a NR-PDSCH reception may be based on the beam used for CORESETs. In certain configurations, the offset value between a CORESET and its associated NR-PDSCH may be similar irrespective of the CORESET number in which the WTRU received scheduling in a DCI.

If the CORESETs are associated with more than one beam, QCL-ed with more than one downlink signal or downlink reference signals, or the like, the default beam for a NR-PDSCH reception may be based on a reference CORESET within the configured CORESETs. A reference CORESET may be configured via a higher layer message, high layer signaling, a RRC message, or the like. A reference CORESET may be determined implicitly based on system parameters, numerology, cell-ID, WTRU-specific parameters, WTRU-ID, cell radio network temporary identifier (C-RNTI), scrambling ID, timing parameters, location parameters, slot number, frame number, radio frame number, BWP number, or the like.

QCL parameters, or a subset of QCL parameters, for the reference CORESET may be used as a default beam for the NR-PDSCH reception. For example, the QCL parameters for NR-PDSCH reception may be similar to the QCL parameters of the reference CORESET. The QCL parameters for the reference CORESET may be reused for the NR-PDSCH reception in the slot or the reference CORESET may be different in each slot. For example, a first CORESET in the configured CORESETs may be used or determined as the reference CORESET in a slot and a second CORESET in the configured CORESETs may be used or determined as the reference CORESET in another slot. When the reference CORESET is changed across slots, the reference CORESET may be cyclically switched among the configured CORESETs. Additionally, the reference CORESET may be a predefined location within the configured CORESETs irrespective of the slot, and the configured CORESETs may be different based on the slot number.

A CORESET located in the latest time location, such as closest to the NR-PDSCH region, within the configured CORESETs may be used, determined, or designated as a reference CORESET. The scheduling offset between a CORESET and its associated NR-PDSCH may be different based on the CORESET type. For example, if a WTRU receives a DCI for NR-PDSCH scheduling in a reference CORESET, a first scheduling offset may be used. If the WTRU receives a DCI for NR-PDSCH scheduling in a CORESET which is a non-reference CORESET, a second scheduling offset may be configured or used. The second scheduling offset may be longer than the first scheduling offset. For example, when a WTRU receives a DCI for NR-PDSCH scheduling in a reference CORESET in a slot #n, the WTRU may receive, decode, or attempt to decode the scheduled NR-PDSCH in slot #n. If a WTRU receives a DCI for NR-PDSCH scheduling in a non-reference CORESET, the WTRU may receive, decode, or attempt to decode the scheduled NR-PDSCH in the slot #n+x. In certain configurations, x may be predefined, configured, indicated, or reported as a WTRU capability.

A TCI field may not be present in the reference CORE-SET but present in other configured CORESETs if more than one beam is used for multiple CORESETs. In this configuration, the WTRU may assume that the NR-PDSCH scheduled via a DCI in the reference CORESET may be a similar beam, QCL-ed with a same downlink reference signal, or the like as the reference CORESET. A WTRU may assume that the NR-PDSCH scheduled via a DCI which may be received in other configured CORESETs may be a different beam, QCL-ed with a different downlink reference signal, or the like with the reference CORESET.

Determining an Rx beam before the scheduling offset using a pre-configured beam, a pre-defined beam, a rule based beam determination, or updating spatial QCL assumption may be jointly or hybrid applied in a pre-determined order. In certain configurations, a rule based beam determination may have highest priority, a pre-configured beam the second highest priority, the pre-defined beam having a third highest priority, or the like.

Figure 9:
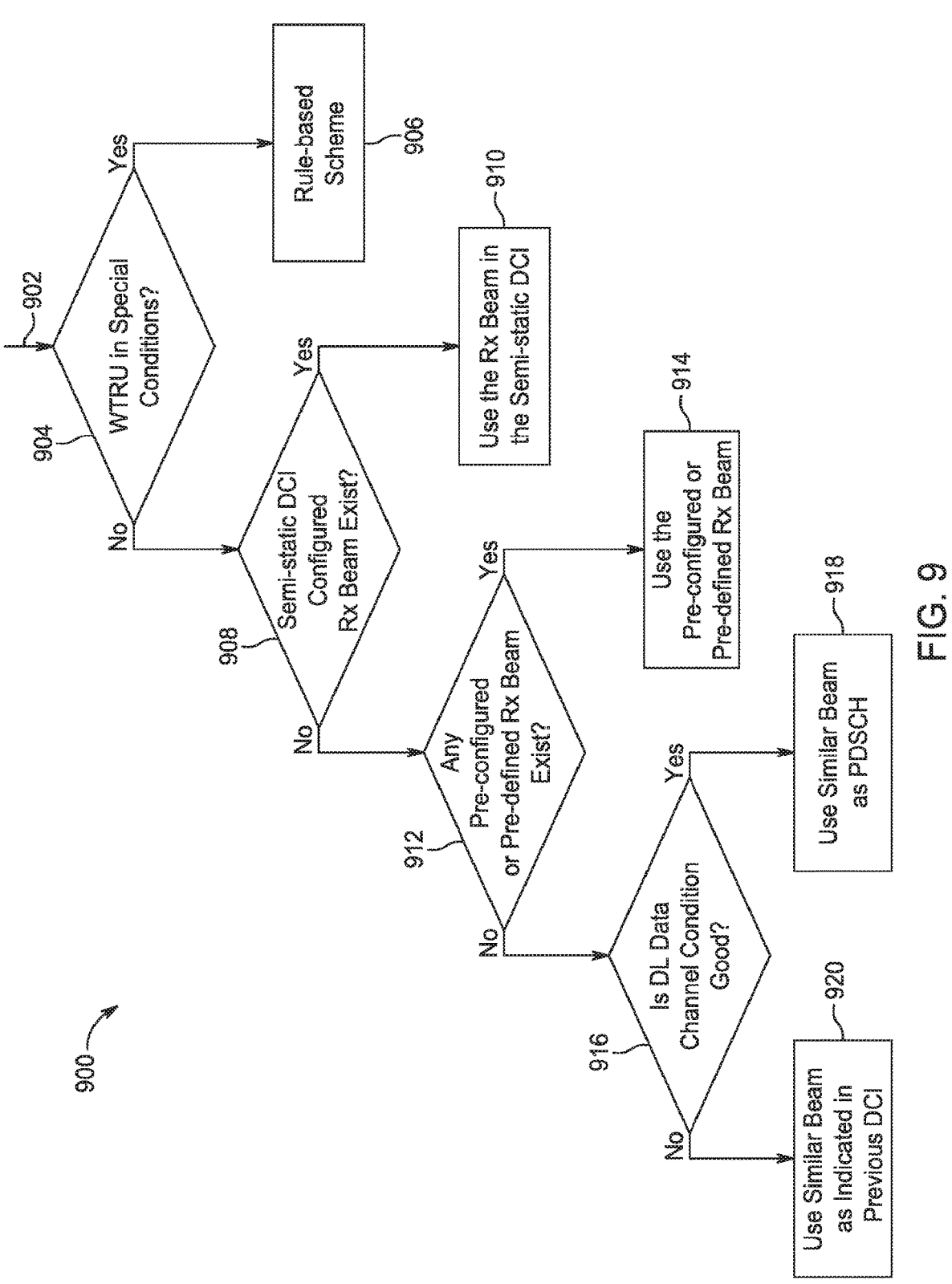
FIG. 9 is an example of a procedure of determining a downlink (DL) receive (Rx) beam before scheduling offset.

FIG. 9 is an example of a procedure of determining a DL Rx beam before a scheduling offset 900. A WTRU may check (902) for one or more special conditions (904). Special conditions may include movement, rotation, speed, elevation, or the like. If so, a rule-based scheme may be utilized (906). Otherwise, the WTRU may check for any semi-statically DCI configured Rx beam (908). If so, the semi-statically configured Rx beam may be utilized (910). Otherwise, the WTRU may check for any pre-configured or pre-defined Rx beam (912). If so, the pre-configured or pre-defined Rx beam may be utilized (914). Otherwise, the WTRU may determine if the DL data channel is in good condition (916). If so, a similar Rx beam as a PDSCH may be utilized (918) or a similar beam as indicated in previous DCI may be utilized (920).

To prevent BPL blocking, a WTRU may be configured to monitor a NR-PDCCH on a different BPL(s) in different NR-PDCCH OFDM symbols. For NR-PDCCH reception, the CORESET and search space configuration may include a reference to one TCI state. In other words, the QCL configuration for NR-PDCCH may contain the information which provides a reference to a TCI state. The DL RS index linked to that TCI state may provide a QCL reference for the NR-PDCCH DMRS reception during a monitoring occasion for the associated CORESET and search space. A WTRU may apply a spatial QCL assumption on the associated CORESET monitoring occasions on a condition that substantially all search space(s) within the CORESET utilize a similar spatial QCL assumption. A WTRU may also apply the spatial QCL assumption on an associated search space. In certain configurations for one or more search spaces within a CORESET, the WTRU may be configured with different spatial QCL assumptions for different search spaces.

If one or more candidate BPLs are configured for a NR-PDCCH, a WTRU may be configured with one CORE-SET and one or more search spaces within the CORESET where the spatial QCL assumption may be on a per search space basis. A WTRU may also be configured with one or more CORESETs where the spatial QCL assumptions is on a per CORESET basis or substantially all the search spaces within one CORESET share similar spatial QCL assumptions.

A WTRU may utilize one or more QCL references associated with multiple candidate beams for NR-PDCCH monitoring and the WTRU may be configured with one or more search spaces associated different Tx beams to prevent BPL blocking. If a QCL reference is on a per search space basis, the one or more configured search spaces of the WTRU may be from similar or different CORESETs. If the QCL reference is on a per CORESET basis, the one or more configured search spaces may be from different CORESETs.

To save resources, a primary serving beam of a WTRU may be utilized over other candidate NR-PDCCH monitoring beams. To increase spectral efficiency, one or more configured search spaces may have different monitoring periodicity. A search space(s) associated with the primary serving beam(s) may be frequently transmitted if a NR-PDCCH is necessary and other search space(s) associated with the back-up beam(s) may be transmitted less frequently. A pre-specified or semi-static configured time domain pattern may be introduced to configure WTRU monitoring of NR-PDCCH with one or more beams or multiple QCL associations. The monitoring periodicities for one or more search spaces may be different where the periodicity of the primary serving beam may be shorter than the periodicity of the secondary serving beam or neighboring beam.

In configurations where a QCL configuration or indication for NR-PDCCH is on a per CORESET basis, the WTRU may apply the spatial QCL assumption on the associated CORESET monitoring occasions. Substantially all search spaces within the CORESET may utilize a similar QCL. The different CORESETs may correspond to different BPLs and each one may be linked to a different TCI state. The secondary serving beam or neighboring beam may be activated or deactivated by a MAC-CE message or signal to provide a longer monitoring periodicity for WTRU power saving and improved performance.

To facilitate the configuration and indication of WTRU monitoring of NR-PDCCH with one or more beams or one or more QCL references for multiple CORESETs, a MAC-CE may be utilized to activate or deactivate one or more semi-persistent CSI-RS resources inside a resource set. In certain configurations, activated CSI-RS resources may be used for a TCI state for monitoring of a NR-PDCCH without monitoring of deactivated CSI-RS resources. The monitoring periodicities for one or more CORESETs may be different where the periodicity of the primary serving beam may be shorter than the periodicity of the secondary serving beam or neighboring beam.

Figure 10:
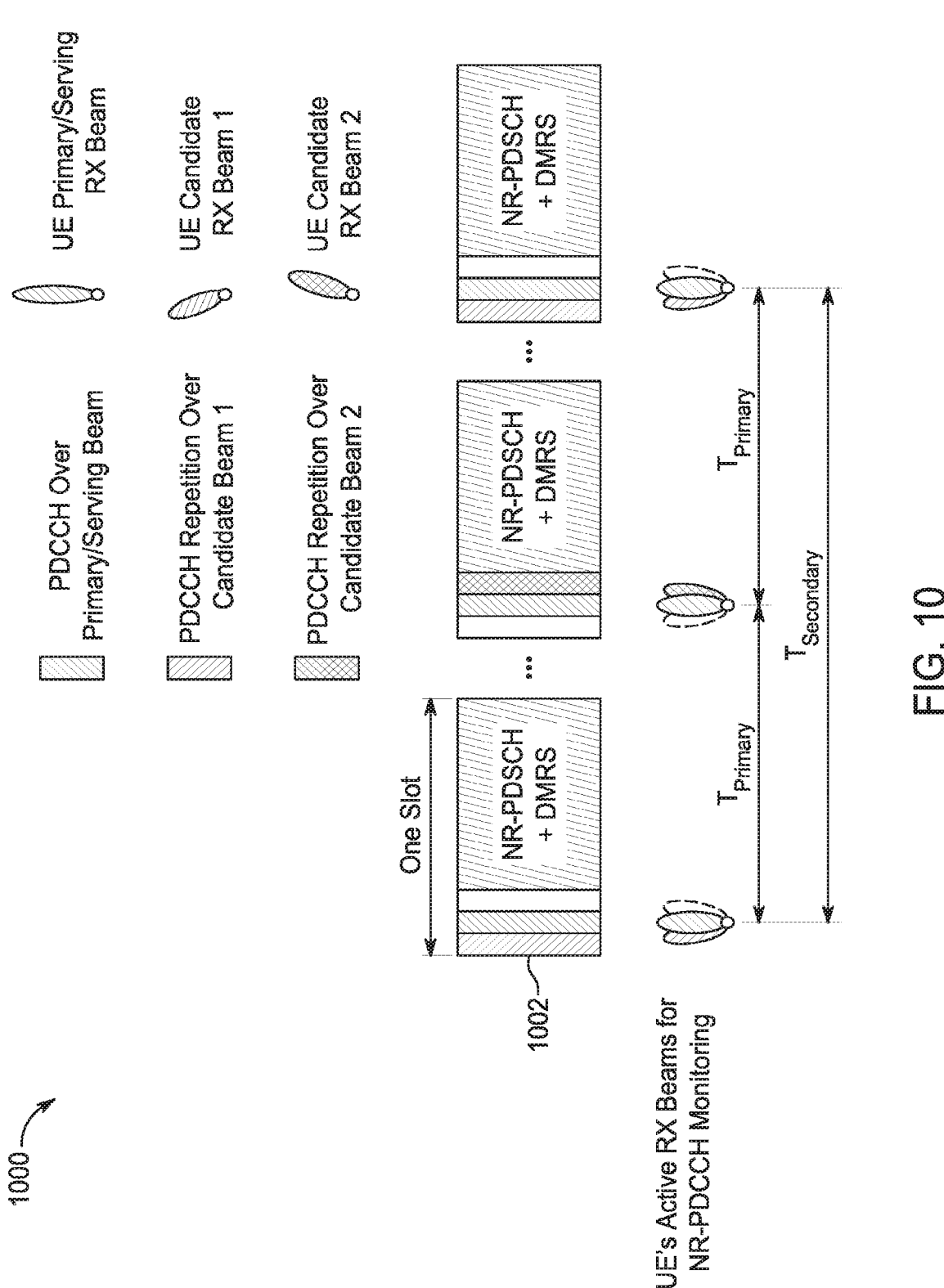
FIG. 10 is a diagram of an example of NR-PDCCH communications over one or more beams.

FIG. 10 is a diagram of an example of NR-PDCCH communications over one or more beams (1000). A WTRU may be configured with one or more QCL associations for NR-PDCCH monitoring. For frames 1002, monitoring periodicities for one or more search spaces may be different. For example, the periodicity of the primary serving beam may be shorter than the periodicity of the secondary serving beam or neighboring beam, where $T_{Secondary}$ may be twice as long as $T_{Primary}$. The NR-PDCCH monitoring over the primary serving beam may regularly be present, while the NR-PDCCH monitoring over the other two candidate beams may alternate for reception. With more frequent monitoring of the primary serving beam and alternative monitoring of the secondary serving beams, overhead and power consumption may be reduced while maintaining robustness of one or more NR-PDCCH monitoring.

Since blind decoding of search spaces may result in large latency and power consumption, the WTRU directly skipping NR-PDCCH monitoring instances even if present may reduce overhead. For example, based on the SNR value, BLER value, L1-RSRP, or the like from recent beam measurements, the WTRU may know the quality of the primary serving beam and whether the NR-PDCCH reception or decoding over the primary serving beam may be successful. In addition, if NR-PDCCH reception or decoding is successful at one slot, the monitoring of other candidate search spaces in the next slot or next M slots may be skipped. M may be a configurable value or the value of M may be evaluated based on some pre-defined rules, such as the threshold value of the quality of the primary serving beam. Optimization of monitoring one or more search spaces may be part of BM procedures, where periodic or aperiodic beam measurement and reporting may determine whether NR-PDCCH monitoring may be skipped. The indication of skipping NR-PDCCH monitoring may be included in a field of a DCI and the NR-PDCCH monitoring over the primary serving beam may be confirmed with the help of HARQ ACK/NACK feedback.

Different operations may be utilized for the configuration of the DL reference signal for BM. For both CSI acquisition and BM, an aperiodic resource setting(s) may contain more than one CSI-RS resource set. Additionally, for BM, there may be a configuration of up to S=16 CSI-RS resource sets per resource setting and Ks=1~64 CSI-RS resources per resource set.

For beam sweeping, there may be one or more CSI-RS resources transmitted within a time slot. A CSI-RS resource may comprise an OFDM symbol. The total number of available OFDM symbols within a time slot may be insufficient to transmit substantially all configured resources within one CSI-RS resource set. With a dynamic number of CSI-RS resources, periodic, semi-persistent, aperiodic, or the like CSI-RS transmissions may be utilized for efficient BM.

For beam indication, each TCI state may associate with one RS set. In addition, one or more RS IDs may be configured. Each RS ID may relate the QCL association between the TCI state and the RS ID(s) or resources.

Multi-slot configuration of CSI-RS resources for BM may be configured. A resource setting may contain more than one CSI-RS resource set, such as S>=1 resource sets are configured to one resource setting, each of which may comprise of Ks>=1 CSI-RS resources. For beam sweeping, one CSI-RS resource within a time slot may occupy an OFDM symbol. If the total number of available OFDM symbols within a time slot is insufficient to transmit substantially all the configured resources within one CSI-RS resource set, multi-slot configuration may be used.

A WTRU may also be configured with multi-symbol and multi-slot CSI-RS transmissions. For periodic CSI-RS transmissions, a WTRU may be configured to measure a single CSI-RS resource set. For example, one or more resource sets may be configured to a WTRU where one resource set is measured at a time. The configuration of periodic CSI-RS transmission may include the transmission periodicity, such as once every X slots, symbol location, such as the 1st, 2nd symbol of each slot for the first CSI-RS resource until substantially all resources within a resource set are transmitted. The configuration of periodic CSI-RS transmission may also include slot location, such as depending on the total number of resources and the number of symbols configured for CSI-RS transmissions within each slot, mapped antenna port, or the like. In certain configurations, parameters, such as transmission periodicity, may have the same values across different CSI-RS resources within the configured CSI-RS resource set. In certain configurations, parameters, such as symbol location, may have flexible values that may depend on resource indices within a resource set.

For semi-persistent CSI-RS transmissions, the network may signal in a MAC CE or RRC to select a single CSI-RS resource set for WTRU measurements. During the activation or deactivation of a CSI-RS resource set, the WTRU may dynamically determine symbol locations or slot locations of corresponding Ks CSI-RS resources, within the selected CSI-RS resource set, from configured parameters, such as symbol offset, slot offset values, or the like. The symbol offset or slot offset values may be similar or different for different CSI-RS resources. Also, the offset values may remain the same when the selected CSI-RS resource set is transmitted for each repetition within a semi-persistent duration.

For aperiodic CSI-RS transmissions, the network may signal in DCI, such as for low latency, to select and trigger the transmission of one CSI-RS resource set. The aperiodic CSI-RS triggering offset X may be a configurable value and defined in units of slots, symbols, frames, subframes, or the like. If the aperiodic CSI-RS triggering offset X is defined per resource, the symbol location and slot location of each CSI-RS resource within a resource set may be already known. For example, the offset value may be the symbol level or symbol location known to a WTRU.

If the aperiodic CSI-RS triggering offset X is defined per resource set, the symbol location or slot location of each CSI-RS resource within a resource set may be specifically derived by a WTRU. For example, some DCI fields may carry slot or symbol location information in the form of a bitmap by a WTRU for derivation. A derivation may also be based on the default symbol offset value and slot offset value. These values may be configured during higher layer configurations of resource settings. The derivation may also be based on explicitly higher layer configured parameters, such as RRC explicitly signaled symbol and slot locations, or carried within a similar DCI triggering signaling where some DCI fields may carry slot or symbol location information in a bitmap.

For periodic, semi-persistent, aperiodic, or the like CSI-RS transmissions, resources in a set may occupy adjacent symbols or be dispersed. If some CSI-RS resources occupy adjacent symbols, those resources may be a scheduling group. A CSI-RS resource set may consist of one or more scheduling groups. For each scheduling group, a piece of symbol or slot location information may be needed, and the resources within a similar scheduling group may be transmitted in a time division multiplexing (TDM) manner.

A WTRU may also be configured with one or more resource settings, each resource setting including one or more resource sets, and the configuration of each resource set may contain an information element (IE) indicating whether repetition is "on/off". If repetition is "on", a WTRU may assume the network maintains a similar Tx beam. If the WTRU performs DL Rx beam sweeping, such as P3, the WTRU may need to know symbol or location of a transmitted resource within the resource set. For example, the WTRU may need to know when the CSI-RS resources within a resource are not transmitted in adjacent symbols.

In certain configurations, the WTRU may need to know the starting symbol or slot location and the ending symbol or slot location when the network transmits the whole resource set. If the WTRU does not perform DL Rx beam sweeping, the WTRU may need to know the starting symbol or slot location when the network transmits a whole or complete resource set. For this configuration, the WTRU may not need to measure substantially all the resources within a resource set since those resources are substantially all transmitted on a similar beam.

If repetition is "off", a WTRU may assume the network performs the DL Tx beam sweeping. For this configuration, the WTRU may or may not perform DL Rx beam sweeping, such as P1 or P2. However, the WTRU may need to know the symbol or location of each resource transmitted within the resource set and perform procedures for resource configuration.

For configuration of a DL reference signal for BM, a WTRU may report the desired amount of CSI-RS resources. With this or other assistance information, the network may configure the WTRU with CSI-RS configurations. For periodic and semi-persistent CSI-RS transmissions, the WTRU may perform repeated beam measurement or reporting. For this configuration, since the network knows the desired amount of CSI-RS resources a WTRU may measure, the network may configure more efficient periodic beam reporting. For example, reporting periodicity may be configured according to the transmitted CSI-RS resources.

For aperiodic CSI-RS transmissions, with assistance information, the network may configure a desired amount of CSI-RS resources for a WTRU. In this case, the WTRU may know the number of resources being transmitted before a resource set is DCI triggered for measurement. The slot or symbol location information may be reused for each triggered aperiodic CSI-RS transmission. For example, when a WTRU is triggered to measure aperiodic CSI-RS transmission in X slots, where X is the triggering offset, if the WTRU reported that Y resources are desired, with just one value such as a symbol interval Z for a transmitted resource, the i-th resource may be transmitted in the $i*Z/7$ slot and $i*Z\%7$ symbol by the WTRU.

A QCL indication for CSI-RS may be configured or transmitted. For DL BM, the reference signal aperiodic CSI-RS may be dynamically triggered for flexibility or efficiency. If the time domain offset between the reception of the triggering message that aperiodically triggers one or more sets of CSI-RS resource(s) and the first symbol of the transmitted CSI-RS resource(s) is larger than WTRU capability, such as similar to the threshold K defined for PDSCH reception and WTRU capability, the WTRU may have time to obtain the spatial QCL reference for receiving the triggered CSI-RS resources if a spatial QCL reference is included in the triggering message or state.

If the time domain offset is less than the WTRU capability or if a BM reference signal such as aperiodic CSI-RS resources are scheduled with an offset less than the WTRU capability, the spatial QCL reference in the triggering state, such as for each aperiodic-CSI-RS (AP-CSI-RS) resource associated with each triggering state, QCL configuration may be provided by an association with one of the M candidate TCI states used for PDSCH reception. In this configuration a default or fallback spatial QCL reference may also be utilized. As an example, a WTRU may assume that the triggered CSI-RS resources are QCL-ed with a QCL-TypeD, spatial QCL parameter, or the like with the same DL RS for the reception of PDSCH in the same slot where the triggered CSI-RS resources are scheduled.

Moreover, if the triggered CSI-RS is scheduled with an offset less than the WTRU capability, the WTRU may use a similar beam to receive the CSI-RS resources as the WTRU receives the PDSCH in the same slot. In this configuration, a spatial QCL reference carried in the triggering message or indicated by the triggering message, such as a triggering message indicates a TCI state and the TCI states indicates an spatial QCL reference, may override WTRU assumptions. For example, an assumption may be where a WTRU assumes that a similar beam used for PDSCH reception in the same slot is used for CSI-RS reception.

A WTRU may also ignore the triggered CSI-RS resource if an offset between the associated PDCCH and the triggered CSI-RS resource is less than a threshold. An offset may be determined based on time locations of the last symbol of the associated PDCCH and the first symbol of the CSI-RS resource. For example, the threshold may be Threshold-Sched-Offset. In certain configurations, the WTRU may not report triggered CSI associated with the triggered CSI-RS resource due to the offset.

For a DL reference signal for BM, there may be an association of TCI state with RS resources. A network may send a RRC message(s) to configure one or more TCI states to a WTRU and the network may activate or select part or substantially all of the configured TCI states. Each TCI state may be RRC configured with one RS set as a QCL reference.

When a WTRU performs beam measurement or reporting, the WTRU may measure the L1-RSRP of configured RS resources. A configured or activated TCI state may be used by the network to achieve beam indication based on WTRU reported beam measurement results. The association between the RS resources and TCI states may be utilized to map WTRU reported beam measurement results and network indicated TCI state. RS resources may be SSB resources or CSI-RS resources. A CSI-RS resource may be for periodic transmission, aperiodic transmission, or semi-persistent transmissions. For periodic CSI-RS transmissions, the spatial QCL of the transmitted CSI-RS resources may be configured through a reference, such as a TCI state index, to a configured TCI state.

For aperiodic CSI-RS transmissions, the spatial QCL of substantially all aperiodic CSI-RS resources, such as non-zero power CSI-RS (NZP-CSI-RS) or zero power CSI-RS (ZP-CSI-RS) based interference measurement resource (IMR), may first be RRC configured through association with the configured TCI states. When part or substantially all of the aperiodic CSI-RS resources are DCI triggered for WTRU aperiodic beam measurement and reporting, the spatial QCL of those transmitted aperiodic CSI-RS resources may be indicated through a DCI, AP-CSI-report-triggering state indication, or the like.

For semi-persistent CSI-RS transmissions, the spatial QCL for the transmitted CSI-RS semi-persistent resources may be indicated in the same MAC-CE message or signal that activates the SP-CSI-RS. Thus, the spatial QCL of semi-persistent CSI-RS may be configured through RRC and activated or deactivated through MAC-CE.

For SSB transmissions, the spatial QCL of the transmitted SSB resources may be provided by higher layer or RRC configurations through references or a TCI state index to configured TCI states. This configuration may be performed at a similar time when the WTRU is initialized or subsequently after WTRU initial access of RRC configured with one or more TCI states. This configuration may also be performed at a later RRC update or reconfiguration of one or more of the TCI states. In certain configurations, when a MAC-CE is used to select up to 2^N TCI states out of substantially all the configured TCI states, it may also be used to configure on RS resources for WTRU beam measurement or reporting.

Spatial QCL relations of RS resources may be included in a TCI table. The same or different RS resources may be configured for the spatial QCL with one or more TCI states. If the same RS resource(s) have spatial QCL with one or more TCI states, the TCI states may be similar in terms of spatial QCL assumptions, such as DL beams associated with those TCI states are geographically close to each other and have similar spatial QCL assumptions. Table 5 is an example of a TCI state table where one or more RS IDs may be configured for a single TCI state. Each RS ID may be associated with a RS type that is associated with a RS resource. A RS resource may overlap across one or more TCI states. For example, the periodic CSI-RS resource 0 may be configured for both TCI state 0 and TCI state 2.

TABLE 5

| TCI State | RS ID | RS type | RS Resource |
|---|---|---|---|
| 0 | 0 | Periodic | 0 |
| | 1 | Aperiodic | 4 |
| | 2 | Semi-persistent | 3 |
| | 3 | SSB | 2 |
| 1 | 0 | Periodic | 2 |
| | 1 | Aperiodic | 2 |
| | 2 | Semi-persistent | 1 |
| | 3 | SSB | 3 |
| 2 | 0 | Periodic | 0 |
| | 1 | Aperiodic | 1 |
| | 2 | Semi-persistent | 3 |
| | 3 | SSB | 2 |

In certain configurations, beam reporting prioritization may be configured. Beam reporting prioritization may improve reporting performance and efficiency in terms of energy consumption, signaling, overhead, latency, system robustness, or the like. Based on WTRU specific configured CSI-RS resources, such as periodic, semi-persistent, or aperiodic resources, the WTRU may perform different types of beam reporting accordingly. Prioritization of beam reporting may be based on latency, energy consumption, robustness, redundancy control, internal collisions, external collisions, or the like.

For latency sensitive URLLC, high speed mobility, or the like communications, beam reporting may be performed regularly to compensate for fast-changing radio environments. Regular reporting may be performed since delayed beam reporting may contain invalid, expired, or old beam measurement results. Different parts of each beam report, such as critical portions of content or different instances, may be prioritized to achieve low overhead and efficient beam reporting with lower latency.

To reduce energy consumption, beam measurement reporting content or length may be reduced to save energy consumption for low mobility, low power, low remaining battery, low remaining power source, static, substantially fixed, low speed, or the like WTRUs. For performance, although X beams may be used for PDCCH and PDSCH transmission, a WTRU may report Y beams, where Y>X, during beam reporting. Extra reported beams may provide robustness or flexibility in view of beam blockage, beam congestion, or the like.

For redundancy control and reducing overhead with extra beam reporting, in certain configurations a WTRU may report up to 4 Tx beams and corresponding L1-RSRP that are partially used for subsequent PDCCH and PDSCH transmission. If beam quality is substantially stable, such as when low mobility, line of sight, or wide open radio environment, just the needed number of beams may be reported to increase performance.

Reports may collide internally if the time occupancy of the physical channels scheduled to carry the one or more reports overlap. For example, an internal collision may occur when one or more reports are carried on a PUCCH or one report is on a PUCCH and the other report is on PUSCH that overlap in at least one OFDM symbol and are transmitted on the same carrier. Internal collisions may also occur when sending different types of beam reporting, such as aperiodic, semi-persistent, periodic, or the like beam reporting and between beam reporting intended for PDSCH and PDCCH.

For external collisions, in addition to beam reporting, a WTRU may also utilize CSI reporting, SRS transmission, or the like. If there is limited capacity on PUCCH and PUSCH, a WTRU may configured for one or a subset of UL transmissions for beam reporting, CSI reporting, SRS transmissions, or the like. For this configuration, predefined or configured beam reporting priority and dropping rules may be configured. Beam reporting may be prioritized according to beam reporting content or length. For example, the minimum number of beams to be reported may be determined and assigned the highest priority. The value of the minimum number may be directly configurable, depend on the actual number of beams simultaneously used for subsequent PDCCH and PDSCH transmission, or the like. The value of the minimum number may also depend on WTRU capability, number of panels, a configurable threshold value, specific to beams with L1-RSRP above a threshold value Y, or the like.

An extra number of beams for reporting may be determined and assigned lower priorities. A WTRU may be configured to report up to 4 beams, but just 1 beam with measured L1-RSRP above an L1-RSRP threshold may exist. For robustness, flexibility, off-loading, or the like purposes, the network may not use one beam for subsequent PDSCH transmissions even though the beam is reported to have the highest L1-RSRP. A WTRU may assign priority 1 to the second reported beam, and priority 2 and 3 to the third and fourth reported beams, where priority 1 may be higher than priority 2 or 3.

A measured beam may be determined to be the minimum reported beam or an extra reported beam. For BPL establishment for subsequent PDCCH, PDSCH, NR-PDCCH, NR-PDSCH, or the like transmissions, the beams that have desired quality indicated by beam measurement may be the minimum reported beams. To evaluate beam quality for PDCCH/NR-PDCCH beam training, beam quality stability or reliability may be desired over gain. In certain configurations, beams that are measured on periodic SSB resources, such as SSB based beams may be available both at initial access and connected mode, and have larger beam width and more reliable availability, or beams that have lower variations in terms of L1-RSRP values measured in recent configurable value of time window, may be selected as minimum reported beams with higher priority.

To evaluate beam quality for PDSCH/NR-PDSCH beam training, beam quality stability or reliability may be considered similar to PDCCH/NR-PDCCH. For PDSCH/NR-PDSCH, potential beamforming gain may be preferred so that enough transmission capacity is able to meet the WTRU data transmission's requirements. For example, using distribution probability statistics of recently measured L1-RSRP values within a configurable time window, a beam selected as a minimum reported beam for PDCCH/NR-PDCCH transmissions may satisfy that:

$$\frac{\sum_{i=0}^{N/2} RSRP_i}{\frac{N}{2}-1} < Th_1, \sqrt{\frac{\sum_{i=1}^{N}\left(RSRP_i - \overline{RSRP}\right)}{N-1}} < Th_2. \qquad \text{Equation (2)}$$

In Equation (2), N/2 may be the lower half of substantially all measured L1-RSRP values of a specific beam within a configurable time window, and $\overline{RSRP}$ is the mean of substantially all measured L1-RSRP within a similar time window. The first equation may determine if a beam's average L1-RSRP value of the lower half of substantially all measured value is bigger than a threshold value $Th_1$ so that the beam's quality is sufficient for operation. The second equation may determine if the standard deviation of substantially all measured L1-RSRP values of a beam within a similar time window is smaller than a threshold value $Th_2$, the beam's quality may be sufficiently stable for operation.

A beam selected as a minimum reported beam for PDSCH/NR-PDSCH transmissions may satisfy:

$$\frac{\sum_{i=0}^{N/2} RSRP_i}{\frac{N}{2}-1} < Th_3, \sqrt{\frac{\sum_{i=1}^{N}\left(RSRP_i - \overline{RSRP}\right)}{N-1}} < Th_4. \qquad \text{Equation (3)}$$

In Equation (3), the threshold value $Th_3$ and $Th_4$ may be similar or different from $Th_1$ and $Th_2$. For example, it may be desirable that a PDSCH/NR-PDSCH beam have a higher worse case L1-RSRP value ($Th_3 > Th_1$), but tolerate higher stand derivation value ($Th_2 > Th_4$).

Minimum reported beams may be determined by ranking L1-RSRP values, from current measurement or averaged among multiple recent measurements, of substantially all the measured beams and selecting the highest values. For example, a network may use a similar beam for subsequent PDCCH/NR-PDCCH and PDSCH/NR-PDSCH transmissions for a WTRU to reduce BM overhead. A RSRQ, RSSI, or other measurement value may be used instead of RSRP values or jointly considered to rank beam qualities.

During beam training, the cost of beam switching, such as DL Tx beam, DL Rx beam, or both, may significantly vary over time. In intra-TRP beams switching, if the radio front end of a network device or gNB is deployed on a TRP, it may be faster than inter-TRP beam switching if a gNB manages one or more TRPs, since data may need to be forwarded from one TRP to another one. Inter-gNB beam switching may incur more overhead and delay than intra-gNB beam switching due to control plane traffic, handover signaling, higher layer negotiations, data plane traffic, data path reestablishment, data forwarding, core network signaling, WTRU service subscription checks, or the like.

For beam selection and prioritization based on content or length, beams may be selected as a minimum reported beam according to a first rule, then according to a second rule if the first rule is the same, and so forth for any number of rules. A rule may consider a beam's measurement quantity, L1-RSRP is above a threshold value $Th_x$, a beam is usable, a beam belongs to the same TRP as the current serving beam(s), a beam's measurement quantity is substantially above a threshold value $Th_y$, where $Th_y > Th_x$, or the like.

Other rules may include a beam belonging to the same network device, TRP, gNB, or cell a beam's average measurement quantity among recent Y measurement results, or the like.

Beam reporting may be prioritized according to one or more pre-defined, specified, or configured beam reporting conditions or rules. In certain configurations, a beam(s) with the highest L1-RSRP value changes may be reported with the highest priority. In other configurations, X new beams, such as beams that have not been previously reported, may be reported with the highest priority.

If beams reported in the current report are partially or completely the same as the last report, the beam ID(s) may have lower priority and the L1-RSRP values may have higher priority. If the L1-RSRP values of the reported beams are similar or within a configurable offset range, such as 1 dB higher or smaller, the whole beam reporting may be assigned with a lower priority to save resources because the current beam report is similar to the previous report. The whole beam may also be consolidated as a simplified version to reduce overhead, such using a short-fixed value 00 to indicate a similar L1-RSRP value as last reporting, instead of L1-RSRP values.

If a power source limited or battery-constrained WTRU indicates a low remaining power source or battery level, a WTRU may assign the best X (X>=1) beams with the highest priority, even though the WTRU may be capable of utilizing Y (Y>=X) beams simultaneously without power or energy limits. This may be performed by the WTRU in a power or battery saving mode. As the DL active BWP for a WTRU changes dynamically, the frequency band and corresponding beam property, attenuation, path loss may impact beam quality. Correspondingly, beam reporting frequency and payload may also change. As the UL active BWP for a WTRU changes dynamically, PUCCH or PUSCH resources for beam reporting may change dynamically. Beam reporting content may be prioritized so that overhead fits available UL resources and beam reporting content may be specified per UL BWP candidate.

For beam reporting prioritization, the WTRU may determine whether UL, UL-SCH, PUCCH, PUSCH, or the like resources for planned UL transmissions, such as different types of CSI reporting, beam reporting, SRS transmissions, or the like are overlapping in a slot. Overlapping may occur during different types of beam reporting, between beamforming reporting and CSI reporting, between beamforming reporting and SRS transmissions, or the like. Without overlap of UL resources in time, beam reporting may be transmitted according to energy consumption, latency requirements, or the like. In certain configurations, a WTRU may be configured with a certain priority threshold value, and the different parts of beam reporting content that have priority values higher than the configured priority value may be transmitted.

Figure 11:
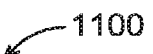
FIG. 11 is a diagram of an example of reference signal (RS) resources.
Figure 11:
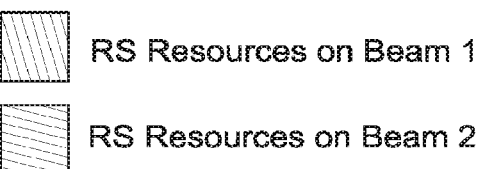
Figure 11:
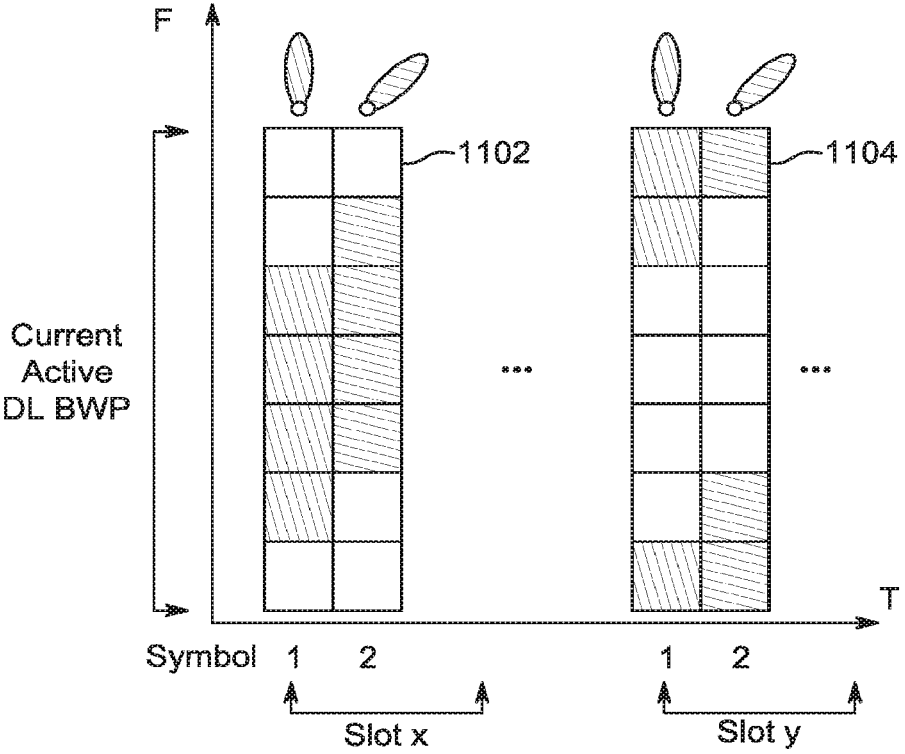

FIG. 11 is a diagram of an example of RS resources 1100. Beam reporting may be a full or wide DL BWP band measurement so that results reflect a full DL BWP band of beam quality. Existing RS resources used for beam measurement reporting may cover less than a full DL BWP band, and additional RS resources may be needed. In 1102, RS resources transmitted on beam 1 and beam 2 at slot x may be unable to cover a full band of the current active DL BWP. In a first configuration, after beam measurement at slot x, a WTRU may utilize slot y for beam reporting such that combined reference signal resources at slot x and slot y provide a full band measurement 1104. RS resources on symbol 1 and symbol 2 at slot x may be QCL-ed or transmitted on the same beam with the RS resources on symbol 1 and symbol 2 at the slot y, respectively. In a second configuration, the WTRU may send the beam report right after the beam measurement when slot x is completed.

In 1100, the first configuration may provide more accurate beam measurement results but experience higher beam report delay. The second configuration may have lower beam reporting delay with less accurate beam measurement results. When lower beam reporting latency is desired, the WTRU may utilize the second configuration and report the sub-band beam measurement reports right after slot x. This configuration may provide a general reference for network DL beam selection. In addition, after slot y the WTRU may send a beam report assigned with a lower priority since the previous report may already be accurate enough for DL beam selection.

If at least two UL transmissions overlap at least partially in time, different parts of beam reporting may be ranked in a priority order. If the at least two overlapping UL trans- missions include more than one beam reporting, for example, aperiodic beam reporting and periodic beam reporting, internal collisions of beam reporting may be addressed before ranking. In a configuration, if more than one beam reporting is of the same type, for example, two semi-persistent beam reports, consolidation into a single beam reporting may be utilized. For example, the WTRU may determine a set of minimum reported beams from one or more sets of the minimum reported beams from one or more beam reports and report one value for each selected beam. A similar configuration may be applied to the set of extra reported beams.

After the consolidation of similar types of beam reporting, if there are still at least two overlapping beam reports, substantially all beam reports may be dropped except the one with the highest priority. The priority of different types of beam reporting may be defined, specified, or configured to follow an order such as beam reporting contained in beam failure recover request, aperiodic beam reporting, semi- persistent beam reporting on PUSCH, semi-persistent beam reporting on PUCCH, periodic beam reporting, or the like. In certain configurations, after prioritization, one beam report may be left for the UL transmissions, and the WTRU may rank the different parts of the remaining beam reporting in a priority order. A similar consolidation configuration may be applied to SRS transmissions, CSI reporting, or the like. After the consolidation, one CSI report or SRS transmission may be left for UL transmissions.

Based on ranked priority order of different parts of beam reporting, for overlapping UL transmissions, different parts may be dropped based on the following order, or any variation of the following order: periodic or semi-persistent SRS; periodic CSI reporting; periodic beam reporting; semi- persistent CSI reporting on PUCCH; semi-persistent CSI reporting on PUSCH; semi-persistent beam reporting on PUCCH; semi-persistent beam reporting on PUSCH; ape- riodic SRS; and aperiodic CSI reporting or beam reporting.

After the parts are dropped, a remaining part may be the beam reporting contained in an existing beam failure recover request. A beam failure recover request may have the highest priority since during beam recovery, triggered aperiodic transmissions may become invalid. In certain configura- tions, the BPL between the WTRU and network may have to be recovered before the reporting is transmitted. Trans- missions dropped on the PUSCH may be partial in the time domain. For example, in certain configurations only those OFDM symbols that collide with the PUCCH, such as aperiodic beam reporting on PUCCH, may need to be dropped.

When two UL transmissions have similar transmission configurations such as periodic beam reporting and periodic CSI reporting, periodic CSI reporting may be dropped in certain configurations. For dropping related to aperiodic CSI reporting and aperiodic beam reporting, a report may be dropped if the content of the beam report is similar to a previous beam report. Similarity between beam reports may be based on a difference of L1-RSRP values in the current report and previous report. A beam report may be dropped if the content of a current beam report has beams from the same TRP and different TRP, or the same cell/gNB and different cell/gNB. A beam report may also be dropped when measurement quantities of the beams belonging to the serving network device, TRP, gNB, cell, or the like are similar or an offset value is within a configurable threshold as the beams reported in a previous report. A beam report may also be dropped if the measurement quantities of beams are already above a certain threshold value that may indicate that the beams are sufficient. In certain configurations, with similar or slightly similar reports, the CSI reporting may be skipped in a slot and scheduled in a following slot with sufficient UL resources.

Figure 12:
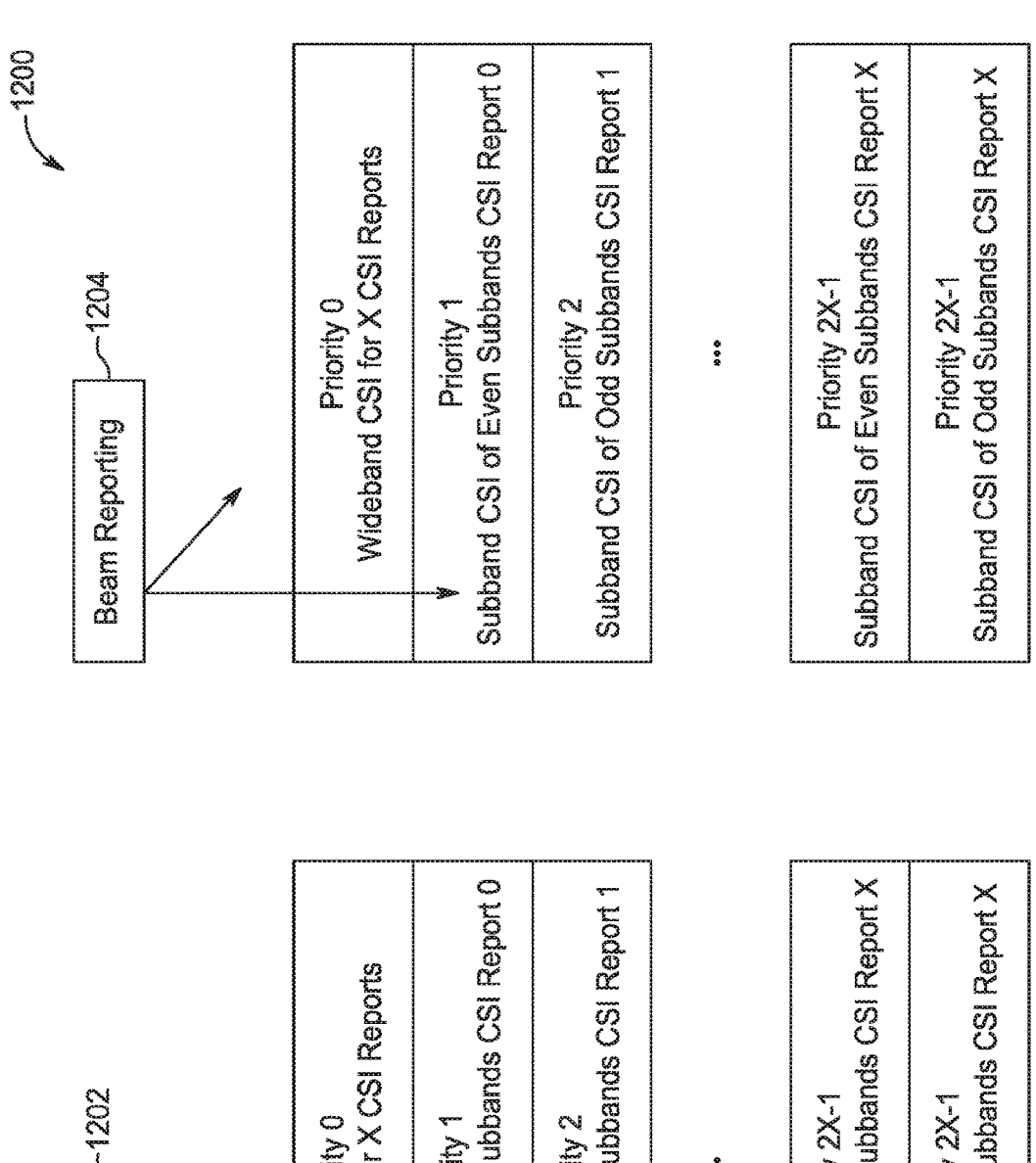
FIG. 12 is a diagram of an example of multiplexing a beam report and part 2 of channel state information (CSI) type II reporting.

FIG. 12 is a diagram of an example of multiplexing a beam report and part 2 of CSI type II reporting 1200. A beam report and the CSI report may be consolidated and multi- plexed. If an aperiodic beam report is multiplexed with aperiodic CSI reporting, both reports may be transmitted on a PUSCH or a long PUCCH. If the aperiodic CSI support type I, where type 1 CSI may be configured for subband CSI, and if the beam report is based on full or wide band measurements 1202, the beam reporting may be put before part 1 of the CSI report. During transmission, as much content may be selected from part 1 first then part 2 without exceeding the maximum number of bits supported by PUSCH resources and the rest of the CSI report may be dropped. If the beam report is based on partial band mea- surements 1204, the beam report may be put before part 1 of the CSI report. For this configuration, during the transmis- sion, the part 1 of the same or adjacent sub-band, such as close to the beam report measured partial band, CSI may be selected.

If an aperiodic CSI configuration supports type II CSI, the beam report may be placed before the part 1 or before the wideband CSI. During transmission, as much content of the part 2 as possible may be selected from the highest priority first without exceeding the maximum number of bits sup- ported by available PUSCH resources, and the rest of the CSI report may be dropped. Part 2 of CSI type II may be skipped level by level beginning with the lowest priority level until the highest priority level. When beam reporting is based on partial band measurement, the sub-band CSI that is closest to the beam measurement based partial band may be assigned as priority 1 for the highest priority among other sub-band CSI. Part 1 may be updated according to actual number of information bits transmitted from part 2, and the size of part 1 may have a fixed payload size, include RI, include CQI, include an indication of the number of non- zero wideband amplitude coefficients per layer for the type II CSI, or the like.

When the higher layer parameter ReportQuantity is con- figured with one of the values 'CRI/RSRP' or 'SSBRI/ RSRP', the CSI report may comprise a single part, and may be transmitted followed by a beam report. If the aperiodic CSI report supports type I CSI, the CSI report may be dropped. If the aperiodic CSI report supports type II CSI, both a CSI report and beam report may be multiplexed and transmitted. In certain configurations, if beam reporting is based on partial band beam measurements, and the partial band is overlapping with the subband reported by the type I CSI of the CSI report, the CSI report may be kept and multiplexed with the beam report.

Beam reporting prioritization may be grouped based on beam reporting prioritization rules given herein. To meet different WTRU requirements, such as energy consumption, latency, service type, feedback capacity limit, or the like, a WTRU may be capable of scalable beam reporting, different beam reporting classes, or the like based on different grouping criteria or rules. Grouping criteria or rules may be based on beam reporting payload size, processing delay, processing latency, WTRU computation complexity, short term measurement, long term weighted average, frequency band, the number of BWPs, beams from the same or different network device, beams from the same or different cells, or the like.

Grouping based beam report prioritization or beam report classes are shown in Table 6, Table 7, and Table 8. In Table 6, if the differential RSRP value is used, the corresponding reference value may be specified. For example, 4 bits may be used to represent differential RSRP values and 16 states may be allowed by the 4 bits. One state of the 16 states may be used to indicate that the corresponding differential RSRP is out of range. Therefore, for differential L1-RSRP reporting, when the largest L1-RSRP is reported as out of range, the maximal value of 7 bit representation may be used as the reference value for calculating a differential L1-RSRP value of remaining L1-RSRP values. A specific value of 7 bit representation may also be used as the reference, for example, the highest value of remaining RSRP values that has 7 bit or 4 bit representation.

Moreover, an upper bound of a range may be used as the reference value. For example, the upper bound of the range of all reported L1-RSRP values may be all reported values in the range of [−140, −15], and the −15 is the upper bound for the reference value. An upper bound of 4 bit representation may also be the reference. For example, considering that 4 bits represents 16 states and a 2 dB as step size, when minimum reported value is −100, the upper bound of 4 bit representation may be −70 or 15 states.

TABLE 6

| Beam Report Classes | Definition | Notes |
|---|---|---|
| Base Layer | Best x beam(s) within Same Network Device/TRP/gNB/cell as Serving Beam(s) | 1. Only beam ID(s). 2. L1-RSRP value(s) are only reported when above threshold value. |
| Enhancement Layer 1 | L1-RSRP Values of the Beams contained in the Base Layer | Differential or absolute L1-RSRP values |
| Enhancement Layer 2 | Besides x Serving Beam(s), the Best y Beam(s) in Neighbouring Network Device(s)/TRP(s)/gNB(s)/cell(s) | The value of x and y may be the same or different. |

TABLE 7

| Beam Report Classes | Definition | Notes |
|---|---|---|
| Low Latency | Best x beam(s) measured within the last y time slot within the active BWP band. For example, SS block + CSI-RS independent L1-RSRP reporting. | The value of x or y may be predefined, specified, or configurable. For example, x and y may be equal to 4 and 1 respectively. |
| Medium Latency | Best x beam(s) measured within the last y time slot within the active BWP band and two adjacent BWP bands. For example, SS block + CSI-RS independent L1-RSRP reporting. | Same as above and the additional measured BWP bands may also be configurable. |
| High Latency | Best x beam(s) measured within the last z time slots within three alternative BWP bands. For example, SS block + CSI-RS joint L1-RSRP reporting. | The value of x or z may be predefined, specified, or configurable, where z may be larger than y to indicate High Latency beam report class. For example, x and z may be equal to 4 and 2 respectively. |

TABLE 8

| Beam Report Classes | Definition | Notes |
|---|---|---|
| Low Payload | Beam ID(s) of the minimum reported beams | The reporting order of the beam IDs may represent the order of the associated L1-RSRP value. |

TABLE 8-continued

| Beam Report Classes | Definition | Notes |
|---|---|---|
| Medium Payload | Beam ID(s) + L1-RSRP values(s) of the minimum reported beams | |
| High Payload | Beam ID(s) + L1-RSRP values(s) of the minimum reported beams + y extra reported beams | It may also be used for candidate beam selection for beam failure recovery. |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), the WTRU comprising:
    a processor and a transceiver, the processor and the transceiver configured to:
    receive an activation command for a first transmission configuration indication (TCI) state;
    receive a first downlink control information (DCI) in a first slot, the first DCI comprising an indication of a first quasi co-location (QCL) reference in a TCI field of the first DCI, wherein the first QCL reference corresponds to the first TCI state;
    receive a second DCI in a second slot, the second DCI comprising an indication of a second QCL reference in a second TCI field of the second DCI and scheduling information for a first physical downlink shared channel (PDSCH) transmission; and
    receive the first PDSCH transmission in accordance with the first QCL reference indicated by the first DCI received in the first slot based on a time value associated with applying the second QCL reference indicated in the second TCI field of the second DCI not having been reached, and wherein the first PDSCH transmission is received in accordance with the scheduling information for the first PDSCH transmission comprised in the second DCI received in the second slot.

2. The WTRU of claim 1, wherein the processor and the transceiver are further configured to:
    receive a third DCI in a third slot, the third DCI comprising scheduling information for a second PDSCH transmission; and
    receive the second PDSCH transmission in accordance with the first QCL reference indicated by the first DCI received in the first slot and in accordance with the scheduling information for the second PDSCH transmission received in the third slot.

3. The WTRU of claim 1, wherein the WTRU is configured to utilize the first QCL reference for PDSCH reception based on receiving the first DCI until a condition is satisfied.

4. The WTRU of claim 3, wherein the condition comprises reception of an explicit indication of a new QCL reference.

5. The WTRU of claim 1, wherein the activation command for the first TCI state is comprised in a medium access control (MAC) control element (CE).

6. The WTRU of claim 1, wherein the time value associated with applying the second QCL reference indicated in the second TCI field of the second DCI comprises a configured time value.

7. A method implemented by a wireless transmit/receive unit (WTRU), the method comprising:
    receiving an activation command for a first transmission configuration indication (TCI) state;
    receiving a first downlink control information (DCI) in a first slot, the first DCI comprising an indication of first quasi co-location (QCL) reference in a TCI field of the first DCI, wherein the first QCL reference corresponds to the first TCI state;
    receiving a second DCI in a second slot, the second DCI comprising an indication of a second QCL reference in a second TCI field of the second DCI and scheduling information for a first physical downlink shared channel (PDSCH) transmission; and
    receiving the first PDSCH transmission in accordance with the first QCL reference indicated by the first DCI received in the first slot based on a time value associated with applying the second QCL reference indicated in the second TCI field of the second DCI not having been reached, and wherein the first PDSCH transmission is received in accordance with the scheduling information for the first PDSCH transmission comprised in the second DCI received in the second slot.

8. The method of claim 7, further comprising:
    receiving a third DCI in a third slot, the third DCI comprising scheduling information for a second PDSCH transmission; and
    receiving the second PDSCH transmission in accordance with the first QCL reference indicated by the first DCI received in the first slot and in accordance with the scheduling information for the second PDSCH transmission received in the third slot.

9. The method of claim 7, wherein the WTRU utilizes the first QCL reference for PDSCH reception based on receiving the first DCI until a condition is satisfied, and wherein the condition comprises reception of an explicit indication of a new QCL reference.

10. The method of claim 7, wherein the activation command for the first TCI state is comprised in a medium access control (MAC) control element (CE).

11. The method of claim 7, wherein the time value associated with applying the second QCL reference indicated in the second TCI field of the second DCI comprises a configured time value.

12. A base station, the base station comprising:

a processor and a transceiver, the processor and the transceiver configured to:

send an activation command for a first transmission configuration indication (TCI) state;

send a first downlink control information (DCI) to a wireless transmit/receive unit (WTRU) in a first slot, the first DCI comprising an indication of first quasi co-location (QCL) reference in a TCI field of the first DCI, wherein the first QCL reference corresponds to the first TCI state;

send a second DCI to the WTRU in a second slot, the second DCI comprising an indication of a second QCL reference in a second TCI field of the second DCI and scheduling information for a first physical downlink shared channel (PDSCH) transmission; and send the first PDSCH transmission to the WTRU in accordance with the first QCL reference indicated by the first slot based on a time value associated with applying the second QCL reference indicated in the second TCI field of the second DCI not having been reached, and wherein the first PDSCH transmission is received in accordance with the scheduling information for the first PDSCH transmission comprised in the second DCI sent in the second slot.

13. The base station of claim 12, wherein the processor and the transceiver are further configured to:

send a third DCI to the WTRU in a third slot, the third DCI comprising scheduling information for a second PDSCH transmission; and send the second PDSCH transmission to the WTRU in accordance with the first QCL reference indicated by the first DCI sent in the first slot and in accordance with the scheduling information for the second PDSCH transmission comprised in the third DCI sent in the third slot.

14. The base station of claim 12, wherein the first QCL reference corresponds to a first beam.

15. The base station of claim 12, wherein the processor and the transceiver are further configured to send an explicit indication of a new QCL reference.

16. The base station of claim 12, wherein the activation command for the first TCI state is comprised in a medium access control (MAC) control element (CE).

17. The base station of claim 12, wherein the time value associated with applying the second QCL reference indicated in the second TCI field of the second DCI comprises a configured time value.

\* \* \* \* \*